US012651452B2

(12) United States Patent
Chen et al.

(10) Patent No.: US 12,651,452 B2
(45) Date of Patent: Jun. 9, 2026

(54) ACCELERATOR CIRCUITRY FOR ACCELERATION OF NON-MAXIMUM SUPPRESSION FOR OBJECT DETECTION

(71) Applicant: Nanyang Technological University, Singapore (SG)

(72) Inventors: Chunyun Chen, Singapore (SG); Mohamed Mostafa Sabry Aly, Singapore (SG)

(73) Assignee: Nanyang Technological University, Singapore (SG)

( * ) Notice: Subject to any disclaimer, the term of this patent is extended or adjusted under 35 U.S.C. 154(b) by 287 days.

(21) Appl. No.: 18/593,037

(22) Filed: Mar. 1, 2024

(65) Prior Publication Data

US 2024/0296670 A1 Sep. 5, 2024

(30) Foreign Application Priority Data

Mar. 1, 2023 (SG) ........................... 10202300546V

(51) Int. Cl.
G06V 10/94 (2022.01)
G06V 10/22 (2022.01)
G06V 10/26 (2022.01)

(52) U.S. Cl.
CPC ............ G06V 10/955 (2022.01); G06V 10/22 (2022.01); G06V 10/26 (2022.01)

(58) Field of Classification Search
CPC ....... G06V 10/955; G06V 10/26; G06V 10/22
See application file for complete search history.

(56) References Cited

U.S. PATENT DOCUMENTS

| 7,551,785 B2 * | 6/2009 | Qian ....................... G06T 9/008 375/240 |
| 9,542,751 B2 * | 1/2017 | Mannino ................... G06T 7/73 |
| 10,769,493 B2 * | 9/2020 | Yu ........................... G06V 10/82 |
| 10,861,217 B2 * | 12/2020 | Moloney ................ G01C 21/20 |
| 11,481,862 B2 * | 10/2022 | Mao ......................... G06V 10/82 |
| 2016/0328856 A1 * | 11/2016 | Mannino ................... G06T 7/11 |
| 2017/0061229 A1 * | 3/2017 | Rastgar ................... G06T 7/248 |
| 2019/0057507 A1 * | 2/2019 | El-Khamy ................ G06T 7/11 |
| 2019/0130189 A1 * | 5/2019 | Zhou ................. G06V 10/7515 |
| 2019/0258878 A1 * | 8/2019 | Koivisto ................ G01S 7/417 |
| 2022/0222477 A1 * | 7/2022 | Shen ....................... G06N 3/096 |

FOREIGN PATENT DOCUMENTS

EP 3876206 A2 * 9/2021 ............. G06T 19/00

OTHER PUBLICATIONS

Guo et al., 2019, "Creating 3D Bounding Box Hypothesis from Deep Network Score-Maps" (pp. 904-908) (Year: 2019).*
Bachrach et al., "Chisel: Constructing Hardware in a Scala Embedded Language," in DAC Design automation conference 2012. IEEE, pp. 1212-1221, 2012.
Bodla et al., "Soft-NMS—Improving Object Detection With One Line of Code," in ICCV, pp. 5561-5569, 2017.
(Continued)

*Primary Examiner* — Manav Seth
(74) *Attorney, Agent, or Firm* — Cesari and McKenna, LLP; Steven M. Mills

(57) ABSTRACT

This document describes an accelerator circuitry for facilitating acceleration of non-maximum suppression (NMS) for detection of objections within an image.

20 Claims, 9 Drawing Sheets

(56)     References Cited

OTHER PUBLICATIONS

Cai et al., "MaxpoolNMS: Getting Rid of NMS Bottlenecks in Two-Stage Object Detectors," in CVPR, 2019, pp. 9356-9364.

Dalal & Triggs, "Histograms of Oriented Gradients for Human Detection," in 2005 IEEE computer society conference on computer vision and pattern recognition (CVPR'05), vol. 1. Ieee, pp. 1-8, 2005.

Deng et al., "ArcFace: Additive Angular Margin Loss for Deep Face Recognition," in CVPR, pp. 4690-4699, 2019.

Deng et al., "RetinaFace: Single-stage Dense Face Localisation in the Wild," arXiv preprint arXiv:1905.00641, 2019.

Desai et al., "Discriminative Models for Multi-Class Object Layout," Int J Comput Vis, pp. 1-12, 2011.

Everingham et al., "The PASCAL Visual Object Classes (VOC) Challenge," Int J Comput Vis, pp. 1-36, 2009.

Felzenszwalb et al., "A Discriminatively Trained, Multiscale, Deformable Part Model," in 2008 IEEE conference on computer vision and pattern recognition. Ieee, pp. 1-8, 2008.

Girshick et al., "Rich feature hierarchies for accurate object detection and semantic segmentation," in CVPR, pp. 580-587, 2014.

Girshick, "Fast R-CNN," in CVPR, pp. 1440-1448, 2015.

He et al., "Deep Residual Learning for Image Recognition," in CVPR, 2016, pp. 770-778.

Henderson & Ferrari, "End-to-end training of object class detectors for mean average precision," in Asian Conference on Computer Vision. Springer, 1-15, 2016.

Hosang et al., "A convnet for non-maximum suppression," in GCPR, pp. 1-14, 2016.

Hosang et al., "Learning non-maximum suppression," in Proceedings of the IEEE conference on computer vision and pattern recognition, pp. 4507-4515, 2017.

Jiang et al., "Acquisition of Localization Confidence for Accurate Object Detection," in Proceedings of the European conference on computer vision (ECCV), pp. 1-16, 2018.

Lecun et al., "Deep learning," Nature, vol. 521, No. 7553, pp. 436-444, 2015.

Lin et al., "Feature Pyramid Networks for Object Detection," in Proceedings of the IEEE conference on computer vision and pattern recognition, pp. 2117-2125, 2017.

Lin et al., "Focal Loss for Dense Object Detection," in Proceedings of the IEEE international conference on computer vision, pp. 2980-2988, 2017.

Liu et al., "Adaptive NMS: Refining Pedestrian Detection in a Crowd," in CVPR, pp. 6459-6468, 2019.

Liu et al., "SSD: Single Shot MultiBox Detector," in ECCV, pp. 21-37, 2016.

Mo et al., "A Multi-Task Hardwired Accelerator for Face Detection and Alignment," IEEE Transactions on Circuits and Systems for Video Technology, vol. 30, No. 11, pp. 4284-4298, 2020.

Muralimanohar et al., "CACTI 6.0: A Tool to Understand Large Caches," University of Utah and Hewlett Packard Laboratories, Tech. Rep, vol. 147, pp. 1-20, 2009.

Oro et al., "Work-efficient parallel non-maximum suppression for embedded gpu architectures," in ICASSP, pp. 1-5, 2016.

Oro et al., "Work-Efficient Parallel Non-Maximum Suppression Kernels," The Computer Journal, pp. 1-5, 2020.

Redmon et al., "You Only Look Once: Unified, Real-Time Object Detection," in CVPR, pp. 779-788, 2016.

Ren et al., "Faster R-CNN: Towards Real-Time Object Detection with Region Proposal Networks," Adv Neural Inf Process Syst, vol. 28, pp. 91-99, 2015.

Rothe et al., "Non-Maximum Suppression for Object Detection by Passing Messages between Windows," in ACCV, pp. 1-16, 2015.

Salscheider, "FeatureNMS: Non-Maximum Suppression by Learning Feature Embeddings," in ICPR, pp. 7848-7854, 2021.

Sermanet et al., "OverFeat: Integrated Recognition, Localization and Detection using Convolutional Networks," arXiv preprint arXiv:1312.6229, 2013.

Shi et al., "A Fast and Power-Efficient Hardware Architecture for Non-Maximum Suppression," IEEE Transactions on Circuits and Systems—II: Express Briefs, vol. 66, No. 11, pp. 1870-1874, 2019.

Snyder, "Verilator and systemperl," in North American SystemC Users' Group, Design Automation Conference, 2004.

Viola & Jones, "Rapid Object Detection Using a Boosted Cascade of Simple Features," IEEE Computer Society Conference on Computer Vision and Pattern Recognition, pp. 1-13, 2001.

Viola & Jones, "Robust Real-Time Face Detection," International Journal of Computer Vision, pp. 1-18, 2004.

Wan et al., "End-to-End Integration of a Convolutional Network, Deformable Parts Model and Non-Maximum Suppression," in Proceedings of the IEEE Conference on Computer Vision and Pattern Recognition, pp. 851-859, 2015.

Zhang et al., "PSRR-MaxpoolNMS: Pyramid Shifted MaxpoolNMS with Relationship Recovery," in CVPR, pp. 15840-15848, 2021.

Zou et al., "Object Detection in 20 Years: A Survey," arXiv preprint arXiv:1905.05055, 2019.

* cited by examiner

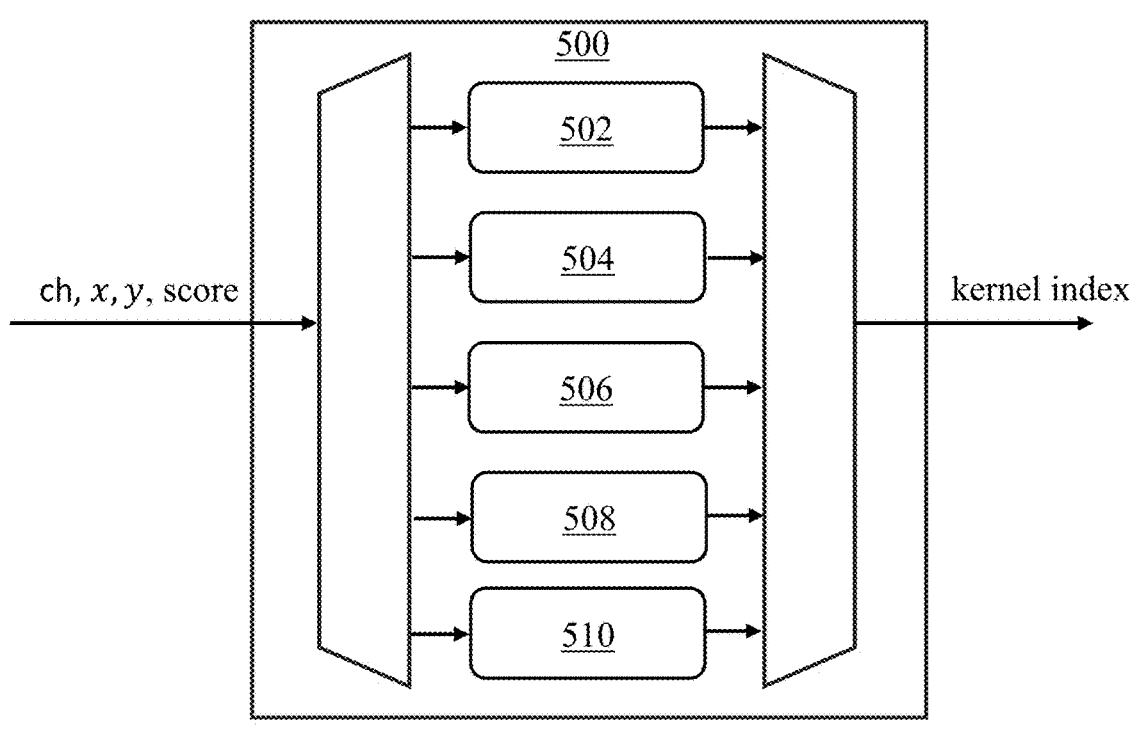
FIGURE 5
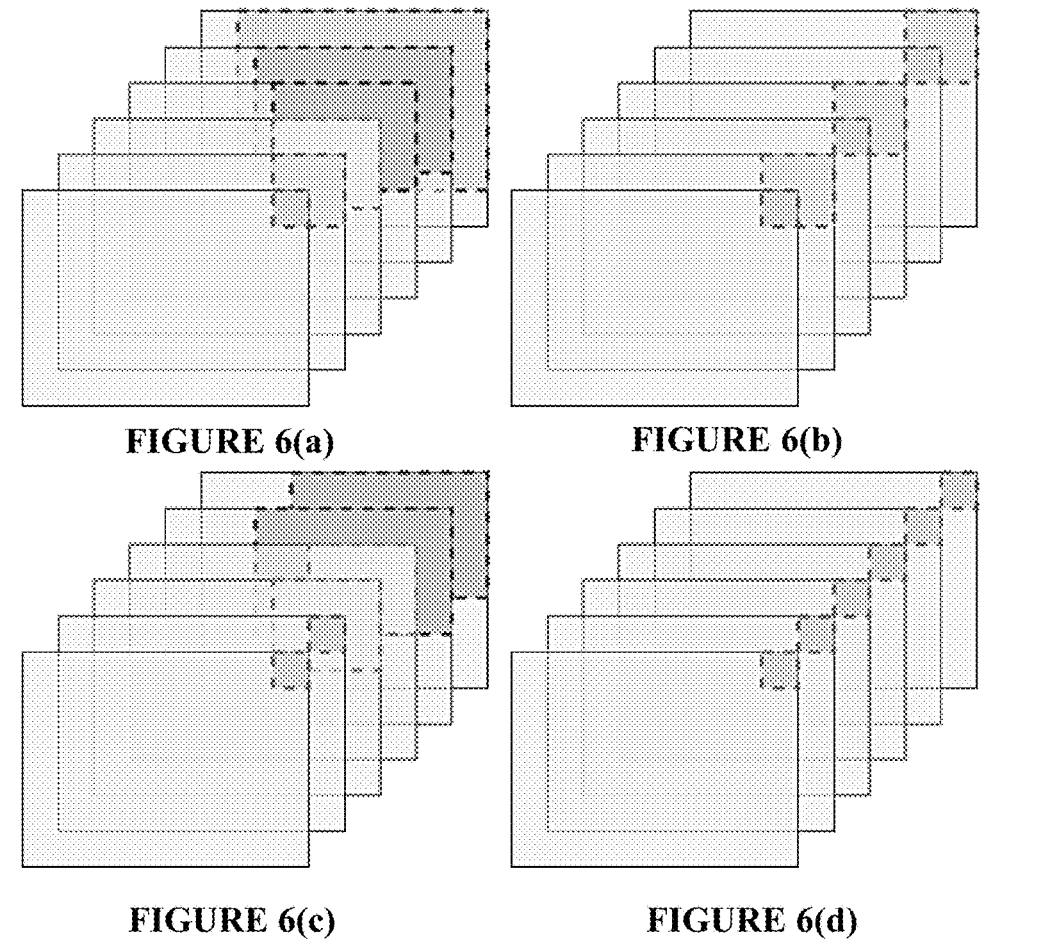
FIGURE 6(a)          FIGURE 6(b)
FIGURE 6(c)          FIGURE 6(d)

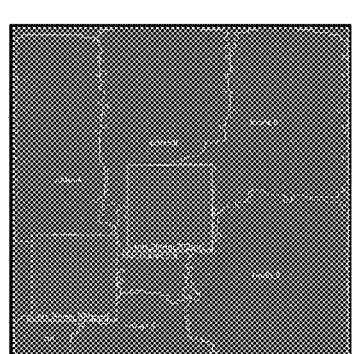
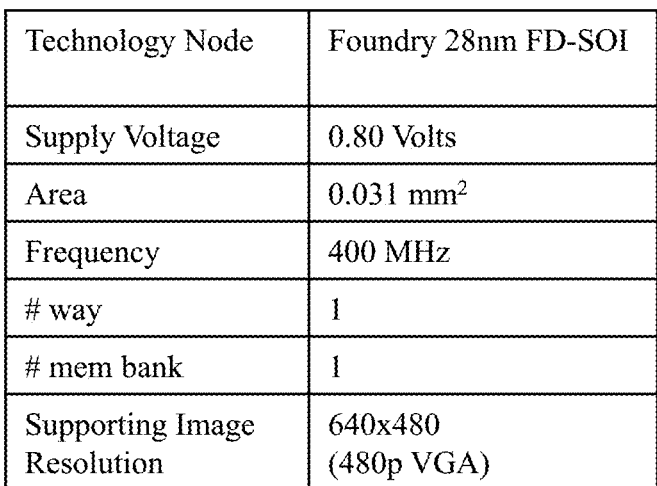
| Technology Node | Foundry 28nm FD-SOI |
|---|---|
| Supply Voltage | 0.80 Volts |
| Area | 0.031 mm$^2$ |
| Frequency | 400 MHz |
| # way | 1 |
| # mem bank | 1 |
| Supporting Image Resolution | 640x480 (480p VGA) |
FIGURE 14(a)        FIGURE 14(b)
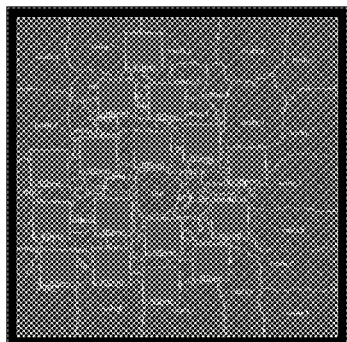
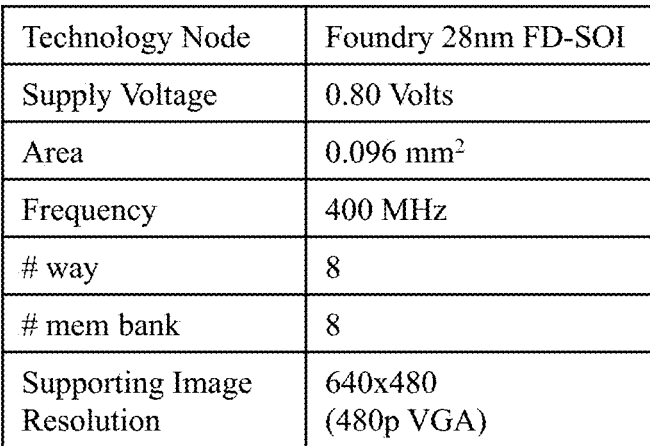
| Technology Node | Foundry 28nm FD-SOI |
|---|---|
| Supply Voltage | 0.80 Volts |
| Area | 0.096 mm$^2$ |
| Frequency | 400 MHz |
| # way | 8 |
| # mem bank | 8 |
| Supporting Image Resolution | 640x480 (480p VGA) |
FIGURE 15(a)        FIGURE 15(b)

ACCELERATOR CIRCUITRY FOR ACCELERATION OF NON-MAXIMUM SUPPRESSION FOR OBJECT DETECTION

CROSS-REFERENCE TO RELATED APPLICATION

This application claims the benefit of priority to Singapore patent application no. 10202300546V which was filed on 1 Mar. 2023, the contents of which are hereby incorporated by reference in its entirety for all purposes.

TECHNICAL FIELD

This application relates to accelerator circuitry for facilitating acceleration of non-maximum suppression (NMS) for detection of objections within an image.

BACKGROUND

Deep Neural Networks (DNNs), commonly referred to as deep learning machine learning models, are increasingly recognized as the de facto standard in modern artificial intelligence (AI) applications. DNNs find extensive utility in a wide spectrum of computer vision tasks including surveillance, image classification, and autonomous driving. The evolution of modern convolutional detection neural networks has significantly contributed to advancements in face recognition, intelligent video analytics, and autonomous driving, owing to their high detection accuracy. Without loss of generality, the application of DNNs may be broadly categorized into two main segments: deep convolutional neural networks (e.g., CNNs, ResNet) and object detectors. Object detectors may be grouped into one-stage paradigms such as Single Shot Multi Box Detector (SSD) and You Only Look Once (YOLO) object detection algorithms in computer vision, and two-stage paradigms like Fast Region-based Convolutional Neural Network (Fast-RCNN) and Faster-RCNN models.

State-of-the-art Convolutional Neural Network (CNN) architectures require fast Non-Maximum Suppression (NMS) algorithms as NMS is mandatory and has become the major performance bottleneck in convolutional object detection pipelines. Notably, contemporary CNN architectures necessitate rapid Non-Maximum Suppression (NMS) algorithms, given that NMS constitutes an essential component and has emerged as a primary performance bottleneck within convolutional object detection pipelines.

Non-maximum Suppression (NMS), as a must-have post-processing technique in all convolutional object detectors, is gradually becoming the performance bottleneck in object detection pipelines. The de-facto standard for NMS, namely GreedyNMS, is composed of a sorting operation over confidence scores for tens of thousands of bounding boxes, followed by nested for loops to greedily select the boxes with high scores and remove the boxes significantly overlapped with the selected ones. Unlike convolutions which are inherently parallel, GreedyNMS cannot be parallelized due to the requirement of "nested for loops". Thus, the GreedyNMS algorithm would gradually dominate the execution time of convolutional object detectors, as convolutions run faster thanks to the increasing parallelism on dedicated hardware (e.g., from P100 to V100 GPU).

As mentioned above, while convolution operations have experienced significant performance enhancements owing to advancements in both hardware scalable architectures (such as Graphics Processing Units (GPUs) and DNN accelerators) and algorithmic optimizations (including depth-wise and pruning techniques), the commonly utilized GreedyNMS algorithm has not seen commensurate improvements and, as a result, has become a dominant factor in inference time. For example, when the Faster-RCNN workload was applied to a PASCAL Visual Object Classes (VOC) dataset as disclosed in the publication titled "The pascal visual object classes (voc) challenge," by M. Everingham et al., and published in the International journal of computer vision, Vol. 88 at pages 303-338, in the year 2010, it was found that the GreedyNMS algorithm consumed 2.76× more time than the entirety of the inference operations when executed on the A100 GPU.

Hence, efficient NMS algorithms are crucial for optimizing the inference time of convolutional object detection models. Although convolution operations have undergone significant optimization, the inference process is still bottlenecked by the computational load imposed by the GreedyNMS algorithm. This disparity in performance highlights the necessity for hardware accelerators that are specifically designed to enhance the efficiency of NMS algorithms.

Despite the efforts of those skilled in the art to address the performance of existing hardware architectures, existing solutions still possess significant computational overheads associated with object detection tasks. Therefore, there is a pressing demand for the development of scalable hardware solutions that are able to support high image resolutions and are able to effectively accelerate NMS algorithms in order to optimize the overall inference process in convolutional object detection frameworks.

SUMMARY

In one aspect, the present application discloses an accelerator circuitry for facilitating acceleration of object detection operations of an image, the circuitry comprising first, second and third sets of processing elements whereby the second and third sets of processing elements are communicatively coupled to first and second data buffers. The first set of processing elements is configured to perform a plurality of first computations in parallel, whereby each first computation comprises receiving a unique bounding box associated with detected features within the image, and projecting the received bounding box to a score map cell in a first-stage three-dimensional confidence score map based on dimensions, a confidence score and a spatial location of the bounding box, and a down sampling ratio of the first-stage three-dimensional confidence score map. The second set of processing elements is configured to perform a plurality of second computations comprising partitioning each channel of the first-stage three-dimensional confidence score map into a plurality of regions, mapping each region in each of the channels of the first-stage three-dimensional confidence score map to a corresponding kernel index in the first data buffer, and for each region, storing, at the corresponding kernel index mapped to the region, a score map cell that has a highest score in the region. The third set of processing elements is then configured to perform a plurality of third computations comprising retrieving the score map cells stored in the first data buffer, forming a padded post first-stage three-dimensional confidence score map based on the retrieved score map cells, partitioning each channel of the padded post first-stage three-dimensional confidence score map into regions, mapping each region in each of the channels of the padded post first-stage three-dimensional confidence score map to a corresponding kernel index in the second data buffer, and for each region, storing, at the corresponding kernel index mapped to the region, a score map cell that has a highest score in the region. The accelerator circuitry then accelerates detection of objects in the image based at least in part on the score map cells stored in the second data buffer.

In a further embodiment of this aspect, before the accelerator circuitry accelerates detection of objects in the image based at least in part on the score map cells stored in the second data buffer, the plurality of second computations performed by the second set of processing elements further retrieves the score map cells stored in the second data buffer, generates a second-stage three-dimensional confidence score map based on the retrieved score map cells, concatenates channels of the second-stage three-dimensional confidence score map that each have a similar scale to form a plurality of scale-concatenated channels, wherein each scale-concatenated channel is associated with a scale of each channel of the second-stage three-dimensional confidence score map; partitions each of the plurality of scale-concatenated channels into regions, maps each region in each of the plurality of scale-concatenated channels to its corresponding kernel index in the first data buffer, and for each region, stores, at its corresponding kernel index mapped to the region, a score map cell that has a highest score in the region. The plurality of third computations performed by the third set of processing elements then further retrieves the score map cells stored in the first data buffer, forms a padded second-stage three-dimensional confidence score map based on the retrieved score map cells, partitions each channel of the padded post second-stage three-dimensional confidence score map into regions, maps each region in each of the channels of the padded post second-stage three-dimensional confidence score map to its corresponding kernel index in the second data buffer, and for each region, stores, at its corresponding kernel index mapped to the region, a score map cell that has a highest score in the region.

In yet another embodiment of this aspect, the plurality of second computations performed by the second set of processing elements further retrieves the score map cells stored in the second data buffer, generates a third-stage three-dimensional confidence score map based on the retrieved score map cells, concatenates channels of the third-stage three-dimensional confidence score map that each have a similar ratio to form a plurality of ratio-concatenated channels, wherein each ratio-concatenated channel is associated with a ratio of each channel of the third-stage three-dimensional confidence score map, partitions each of the plurality of ratio-concatenated channels into regions, maps each region in each of the plurality of ratio-concatenated channels to its corresponding kernel index in the first data buffer, and for each region, stores, at its corresponding kernel index mapped to the region, a score map cell that has a highest score in the region. The plurality of third computations performed by the third set of processing elements further retrieves the score map cells stored in the first data buffer, forms a padded post third-stage three-dimensional confidence score map based on the retrieved score map cells, partitions each channel of the padded post third-stage three-dimensional confidence score map into regions, maps each region in each of the channels of the padded post third-stage three-dimensional confidence score map to its corresponding kernel index in the second data buffer, and for each region, stores, at its corresponding kernel index mapped to the region, a score map cell that has a highest score in the region.

In still yet another embodiment of this aspect, the plurality of second computations performed by the second set of processing elements further retrieves the score map cells stored in the second data buffer, generates a fourth-stage three-dimensional confidence score map based on the retrieved score map cells, partitions each of the channels into regions, maps each region in each of the channels to its corresponding kernel index in the first data buffer, and for each region, stores, at its corresponding kernel index mapped to the region, a score map cell that has a highest score in the region. The plurality of third computations performed by the third set of processing elements further retrieves the score map cells stored in the first data buffer, forms a padded post fourth-stage three-dimensional confidence score map based on the retrieved score map cells, partitions each channel of the padded post fourth-stage three-dimensional confidence score map into regions, maps each region in each of the channels of the post fourth-stage three-dimensional confidence score map to its corresponding kernel index in the second data buffer, and for each region, stores at its corresponding kernel index mapped to the region, a score map cell that has a highest score in the region.

In another aspect, the present application discloses a method to facilitate acceleration of object detection operations of an image using first, second and third sets of processing elements communicatively coupled to first and second data buffers. The disclosed method comprises the steps of performing a plurality of first computations in parallel using the first set of processing elements, each first computation comprising the steps of: receiving a unique bounding box associated with detected features within the image, and projecting the received bounding box to a score map cell in a first-stage three-dimensional confidence score map based on dimensions, a confidence score and a spatial location of the bounding box, and a down sampling ratio of the first-stage three-dimensional confidence score map. A plurality of second computations are then performed using the second set of processing elements, the second set of second computations comprising the steps of: partitioning each channel of the first-stage three-dimensional confidence score map into a plurality of regions, mapping each region in each of the channels of the first-stage three-dimensional confidence score map to a corresponding kernel index in the first data buffer, and for each region, storing, at the corresponding kernel index mapped to the region, a score map cell that has a highest score in the region. A plurality of third computations are subsequently performed using a third set of processing elements, the third set of computations comprising the steps of: retrieving the score map cells stored in the first data buffer, forming a padded post first-stage three-dimensional confidence score map based on the retrieved score map cells, partitioning each channel of the padded post first-stage three-dimensional confidence score map into regions, mapping each region in each of the channels of the padded post first-stage three-dimensional confidence score map to a corresponding kernel index in the second data buffer, and for each region, storing, at the corresponding kernel index mapped to the region, a score map cell that has a highest score in the region, wherein detection of objects in the image are accelerated based at least in part on the score map cells stored in the second data buffer.

In another embodiment of this aspect, before the step of detecting objects in the image are accelerated based at least in part on the score map cells stored in the second data buffer, the plurality of second computations further comprises the steps of: retrieving the score map cells stored in the second data buffer, generating a second-stage three-dimensional confidence score map based on the retrieved score map cells, concatenating channels of the second-stage three-dimensional confidence score map that each have a similar scale to form a plurality of scale-concatenated channels, wherein each scale-concatenated channel is associated with a scale of each channel of the second-stage three-dimensional confidence score map; partitioning each of the plurality of scale-concatenated channels into regions, mapping each region in each of the plurality of scale-concatenated channels to its corresponding kernel index in the first data buffer, and for each region, storing, at its corresponding kernel index mapped to the region, a score map cell that has a highest score in the region. The plurality of third computations then further comprises the steps of: retrieving the score map cells stored in the first data buffer, forming a padded second-stage three-dimensional confidence score map based on the retrieved score map cells, partitioning each channel of the padded post second-stage three-dimensional confidence score map into regions, mapping each region in each of the channels of the padded post second-stage three-dimensional confidence score map to its corresponding kernel index in the second data buffer, and for each region, storing, at its corresponding kernel index mapped to the region, a score map cell that has a highest score in the region.

In yet another embodiment of this aspect, the plurality of second computations further comprises the steps of: retrieving the score map cells stored in the second data buffer, generating a third-stage three-dimensional confidence score map based on the retrieved score map cells, concatenating channels of the third-stage three-dimensional confidence score map that each have a similar ratio to form a plurality of ratio-concatenated channels, wherein each ratio-concatenated channel is associated with a ratio of each channel of the third-stage three-dimensional confidence score map; partitioning each of the plurality of ratio-concatenated channels into regions, mapping each region in each of the plurality of ratio-concatenated channels to its corresponding kernel index in the first data buffer, and for each region, storing, at its corresponding kernel index mapped to the region, a score map cell that has a highest score in the region. The plurality of third computations then further comprises the steps of: retrieving the score map cells stored in the first data buffer, forming a padded post third-stage three-dimensional confidence score map based on the retrieved score map cells, partitioning each channel of the padded post third-stage three-dimensional confidence score map into regions, mapping each region in each of the channels of the padded post third-stage three-dimensional confidence score map to its corresponding kernel index in the second data buffer, and for each region, storing, at its corresponding kernel index mapped to the region, a score map cell that has a highest score in the region.

In still another embodiment of this aspect, the plurality of second computations further comprises the steps of: retrieving the score map cells stored in the second data buffer, generating a fourth-stage three-dimensional confidence score map based on the retrieved score map cells, partitioning each of the channels into regions, mapping each region in each of the channels to its corresponding kernel index in the first data buffer, and for each region, storing, at its corresponding kernel index mapped to the region, a score map cell that has a highest score in the region. The plurality of third computations then further comprises the steps of: retrieving the score map cells stored in the first data buffer, forming a padded post fourth-stage three-dimensional confidence score map based on the retrieved score map cells, partitioning each channel of the padded post fourth-stage three-dimensional confidence score map into regions, mapping each region in each of the channels of the post fourth-stage three-dimensional confidence score map to its corresponding kernel index in the second data buffer, and for each region, storing, at its corresponding kernel index mapped to the region, a score map cell that has a highest score in the region.

BRIEF DESCRIPTION OF THE DRAWINGS

Various embodiments of the present disclosure are described below with reference to the following drawings:

FIG. 5 illustrates a block diagram of a kernel index compute unit or a set of second or third processing elements in accordance with embodiments of the present disclosure;

FIGS. 6(*a*)-6(*d*) illustrate four different sub-modules of a suppression sub-module group in accordance with embodiments of the present disclosure;

FIG. 7(*b*) illustrates the generation of a part of a layer of a padded three-dimensional confidence score map in accordance with embodiments of the present disclosure;

FIG. 14(*a*) illustrates a minimum chip layout of the full acceleration circuitry in accordance with embodiments of the disclosure;

FIG. 14(*b*) illustrates the chip specification of the chip layout illustrated in FIG. 15(*a*);

FIG. 15(*a*) illustrates an optimum chip layout of the full acceleration circuitry in accordance with embodiments of the disclosure;

FIG. 15(*b*) illustrates the chip specification of the chip layout illustrated in FIG. 16(*a*) that provides the optimal performance;

DETAILED DESCRIPTION

Figure 1:
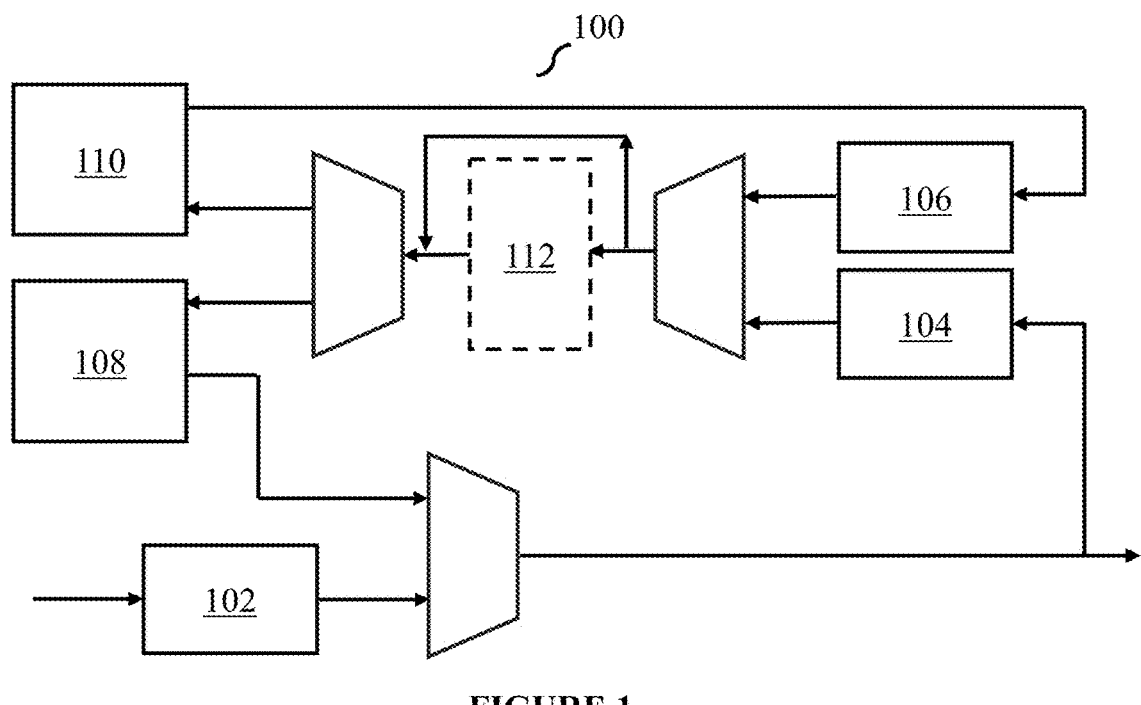
FIG. 1 illustrates a block diagram representative of the accelerator circuitry for facilitating acceleration of object detection operations of an image in accordance with embodiments of the present disclosure.

The following detailed description is made with reference to the accompanying drawings, showing details and embodiments of the present disclosure for the purposes of illustration. Features that are described in the context of an embodiment may correspondingly be applicable to the same or similar features in the other embodiments, even if not explicitly described in these other embodiments. Additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance as generally understood in the relevant technical field, e.g., within 10% of the specified value.

As used herein, the term "and/or" includes any and all combinations of one or more of the associated listed items.

As used herein, "comprising" means including, but not limited to, whatever follows the word "comprising". Thus, use of the term "comprising" indicates that the listed elements are required or mandatory, but that other elements are optional and may or may not be present.

As used herein, "consisting of" means including, and limited to, whatever follows the phrase "consisting of". Thus, use of the phrase "consisting of" indicates that the listed elements are required or mandatory, and that no other elements may be present.

As used herein, the terms "first," "second," and the like in the description, in the claims, and in the figures are used for distinguishing between similar objects and not necessarily for describing a particular sequential or chronological order.

As used herein, in the context of the dimensions of a region in a channel of a three-dimensional confidence score map, the term "kernel" refers to a rectangular region in a channel and is usually used to define the spatial extent of the rectangular region during a specific operation.

As used herein, in the context of the dimensions of a region in a channel of a three-dimensional confidence score map, the term "stride" refers to the number of positions or cells that the kernel moves horizontally and vertically across the channel during a specific operation and is usually employed to determine the amount of overlap between neighboring regions thereby controlling the spatial resolution of the channel.

As used herein, the term "three-dimensional (3D) confidence score map" and the like in the description refers to a volumetric 3D map that extends into three spatial dimensions. Each voxel or score map cell within the 3D space encapsulates a confidence score indicating the likelihood of a particular object's presence at that spatial location. These confidence scores enable the localization, classification, and semantic understanding of objects within a volumetric scene.

Further, one skilled in the art will recognize that certain functional units in this description have been labelled as modules, sub-modules or sets of processing elements throughout the specification. The person skilled in the art will also recognize that a module, a sub-module or a set of processing elements may be implemented as circuits, logic chips or any sort of discrete component. Still further, one skilled in the art will also recognize that a module, a sub-module or a set of processing elements may be implemented in software which may then be executed by a variety of processor architectures. In embodiments of the disclosure, a module, a sub-module or a set of processing elements may also comprise computer instructions, computations or executable code that may instruct a computer processor to carry out a sequence of events based on instructions received. The choice of the implementation of the modules, the sub-modules or the sets of processing elements is left as a design choice to a person skilled in the art and does not limit the scope of the claimed subject matter in any way.

The function of object detection models is to output a bounding box that tightly encloses each target object found within an image. Object detection models not only classify objects within the images but also estimate the locations of detected instances of the objects in the images. These object detection models are usually configured to process an input image to generate candidate bounding boxes around potential objects and each of these bounding boxes are usually accompanied by confidence scores which indicate the likelihood that the detected object belongs to a particular class of object. However, most object detection frameworks (e.g., one-stage or two-stage frameworks) tend to generate redundant, highly overlapped bounding boxes to enclose an object, thereby introducing a large number of false positives.

FIG. 1 illustrates a block diagram representative of the accelerator circuitry for facilitating acceleration of object detection operations of an image in accordance with embodiments of the present disclosure. Accelerator circuitry 100 comprises relationship recovery module (RRM) 102, kernel index compute units (KICUs) 104 and 106, score map memories (SMMs) 108 and 110, and optionally, arbitration module 112. RRM 102 comprises a set of processing elements that are configured to perform a plurality of computations in parallel, KICUs 104 and 106 each comprise a set of processing elements that are configured to perform a plurality of computations, and SMMs 108 and 110 may comprise data buffers configured in a ping-pong arrangement.

In embodiments of the disclosure, each computation performed by RRM 102 is configured to receive a bounding box that encloses an object in an image along with a confidence score assigned to the bounding box. The computation then proceeds to compute a channel, and the spatial location of the received bounding box in a three-dimensional (3D) confidence score map. The outputs from RRM 102, which each contain a score assigned to the bounding box, a channel, and a spatial location of a received bounding box as projected onto a 3D confidence score map, are then provided to KICU 104. In should be noted that KICU 104 may receive a plurality of outputs from RRM 102 as this module is configured to process a plurality of received bounding boxes in parallel.

KICU 104 then forms a 3D confidence score map based on the received plurality of outputs before proceeding to compute kernel indices, i.e., the physical memory addresses, at SMM 110, at which the score map cells of the 3D confidence score map are to be mapped to and stored. Prior to the computation of the kernel index for each score map cell of the 3D confidence score map, KICU 104 is configured to process the 3D confidence score map using either a Single-Channel sub-module, a Cross-Ratio sub-module, a Cross-Scale sub-module or a Cross-All sub-module. The detailed workings of each of these sub-modules will be described in greater detail in the later sections. In embodiments of the disclosure, KICU 104 will directly store the score map cells of the processed 3D confidence score map at their corresponding kernel indices at SMM 110, effectively bypassing arbitration module 112. The detailed workings of arbitration module 112 will also be described in later detail below.

KICU 106 is then configured to retrieve this information stored at SMM 110 to form a padded 3D confidence score map. The kernel indices at SMM 108 at which the score map cells of the padded 3D confidence score map is to be stored are subsequently computed by KICU 106. Once computed, KICU 106 will then proceed to map and store the score map cells of the padded 3D confidence score map at their corresponding kernel indices at SMM 108.

In embodiments of the disclosure, KICU 104 will then retrieve the information stored at SMM 108 to generate a new 3D confidence score map. KICU 104 will then process the 3D confidence score map using a sub-module that had not been previously used as selected from the Single-Channel, the Cross-Ratio, the Cross-Scale or the Cross-All sub-modules. As mentioned above, KICU 104 will then directly store the score map cells of the processed 3D confidence score map at their corresponding kernel indices at SMM 110.

KICU 106 is then configured to retrieve the information stored at SMM 110 to form a new padded 3D confidence score map. The kernel indices at SMM 108 at which the score map cells of the padded 3D confidence score map is to be stored are subsequently computed by KICU 106. Once computed, KICU 106 will then proceed to map and store the score map cells of the padded 3D confidence score map at their corresponding kernel indices at SMM 108.

KICU 104 will subsequently retrieve the information stored at SMM 108 to generate a new 3D confidence score map. At this stage, KICU 104 would have utilized two of the sub-modules from the group of Single-Channel, the Cross-Ratio, the Cross-Scale or the Cross-All sub-modules. Hence, KICU 104 will proceed to process the 3D confidence score map using a new sub-module (that had not been selected previously) from this group of sub-modules. KICU 104 will then directly store the score map cells of the processed 3D confidence score map at their corresponding kernel indices at SMM 110.

KICU 106 then retrieves the information stored at SMM 110 to form a new padded 3D confidence score map. The kernel indices at SMM 108 at which the score map cells of the padded 3D confidence score map is to be stored are subsequently computed by KICU 106. Once computed, KICU 106 will then proceed to map and store the score map cells of the padded 3D confidence score map at their corresponding kernel indices at SMM 108.

KICU 104 will subsequently retrieve the information stored at SMM 108 to generate a new 3D confidence score map. At this stage, KICU 104 would have utilized three of the sub-modules from the group of Single-Channel, the Cross-Ratio, the Cross-Scale or the Cross-All sub-modules. Hence, KICU 104 will proceed to process the 3D confidence score map using the final sub-module that had not been selected previously from this group of sub-modules. KICU 104 will then directly store the score map cells of the processed 3D confidence score map at their corresponding kernel indices at SMM 110.

KICU 106 then retrieves the information stored at SMM 110 to form a new padded 3D confidence score map. The kernel indices at SMM 108 at which the score map cells of the padded 3D confidence score map is to be stored are subsequently computed by KICU 106. Once computed, KICU 106 will then proceed to map and store the score map cells of the padded 3D confidence score map at their corresponding kernel indices at SMM 108.

Accelerator circuitry may then utilize the score map cells stored in SMM 108 to accelerate the detection of objects in the image.

In embodiments of the disclosure, the outputs from KICU 104 may be provided to arbitration module 112, before being stored at SMM 110, and the outputs from KICU 106 may be provided to arbitration module 112, before being stored at SMM 108. In embodiments of the disclosure, arbitration module 112 comprises a plurality of processing elements that are configured to arbitrate any kernel index conflicts that may occur. In particular, module 112 may comprise a crossbar switch that is configured to forward information contained in each score map cell to the corresponding memory bank at SMM 108 or 110 based on the address computed by KICU 106 or 104 respectively. The ratio of the crossbar switch may be N×M, where its number of input ports equals the number of parallel computations performed by RRM 102 or KICUs 104 or 106, i.e. "N", and its number of output ports equals the number of memory banks in SMM 108 and 110, i.e., "M". In embodiments of the disclosure, module 112 may also include a first-in-first-out (FIFO) module configured to reduce conflicts when multiple score map cells are mapped to the same memory bank at the same time. The FIFO module achieves this by configuring the least significant bits of the address as the memory bank selection bits.

Figure 2:
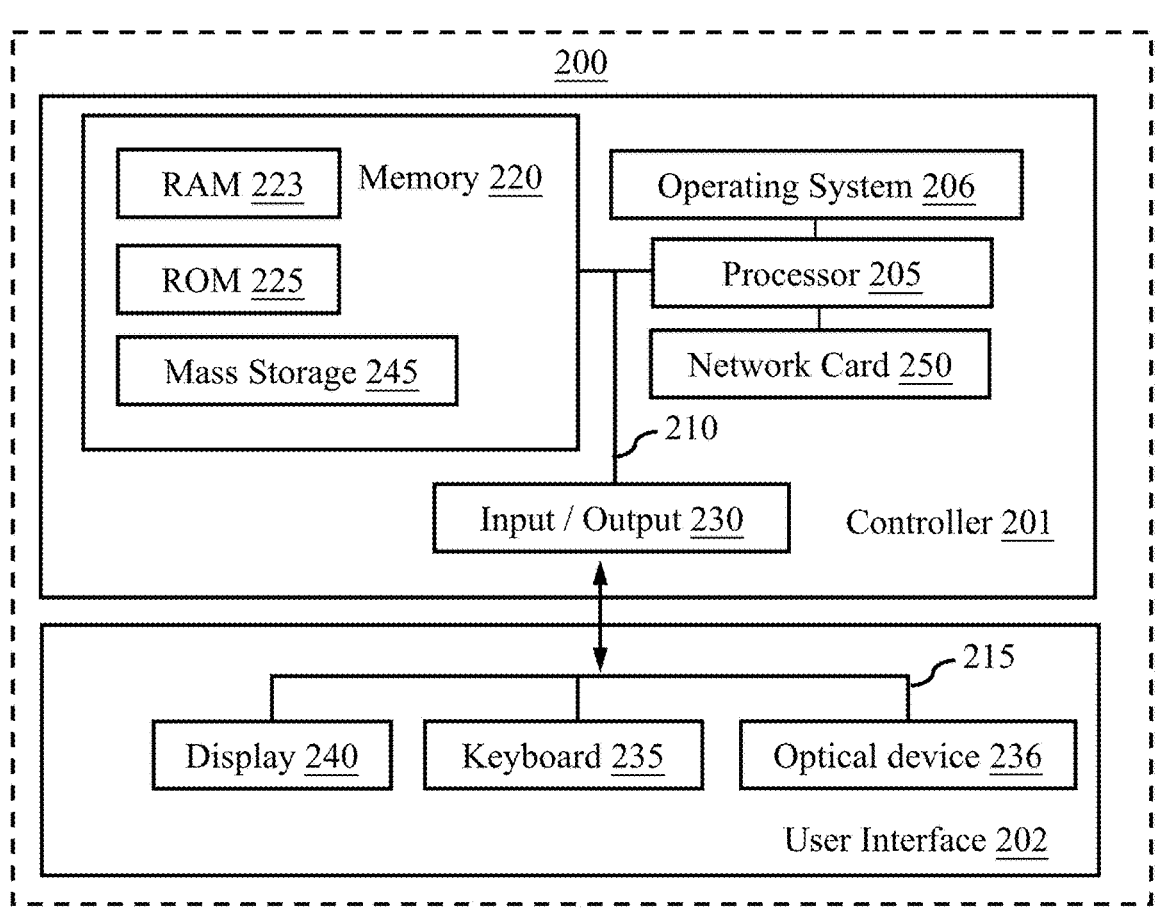
FIG. 2 illustrates a block diagram representative of a processing system for performing embodiments of the present disclosure.

In accordance with embodiments of the present disclosure, a block diagram representative of components of processing system 200 that may be provided within, accelerator circuitry 100, relationship recovery module (RRM) 102, kernel index compute units (KICUs) 104 and 106, and arbitration module 112 to carry out the digital signal processing functions or computations in accordance with embodiments of the disclosure, or any other modules or sub-modules of the system is illustrated in FIG. 2. One skilled in the art will recognize that the exact configuration of each processing system provided within these modules may be different and the exact configuration of processing system 200 may vary and the arrangement illustrated in FIG. 2 is provided by way of example only.

In embodiments of the disclosure, processing system 200 may comprise controller 201 and user interface 202. User interface 202 is arranged to enable manual interactions between a user and the computing module as required and for this purpose includes the input/output components required for the user to enter instructions to provide updates to each of these modules. A person skilled in the art will recognize that components of user interface 202 may vary from embodiment to embodiment but will typically include one or more of display 240, keyboard 235 and optical device 236.

Controller 201 is in data communication with user interface 202 via bus 215 and includes memory 220, processing unit, processing element or processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from these modules via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with processor 205 via bus 210. The memory components include both volatile and non-volatile memory and more than one of each type of memory, including Random Access Memory (RAM) 223, Read Only Memory (ROM) 225 and a mass storage device 245, the last comprising one or more solid-state drives (SSDs). One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, a processing unit, a plurality of processing elements, a microcontroller, a programmable logic device or any other type of computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU. In another example, it could be a cluster of CPU cores operating in parallel to accelerate computations.

Figure 3:
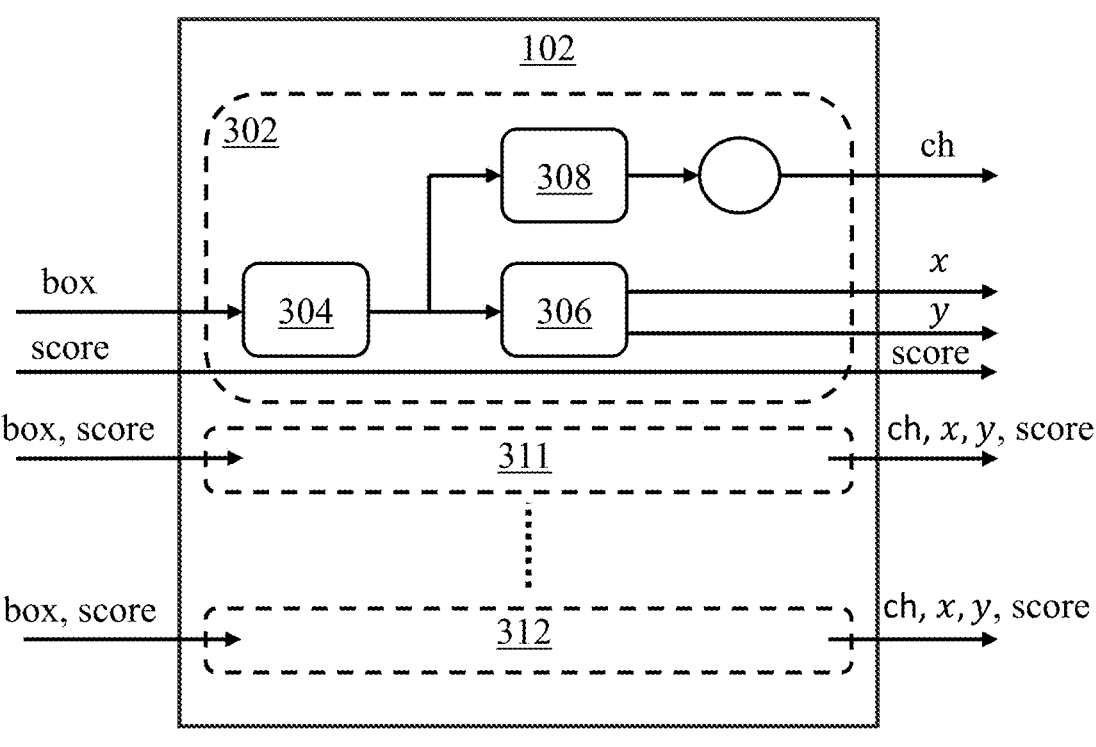
FIG. 3 illustrates a block diagram of a relation recovery module or a set of first processing elements in accordance with embodiments of the present disclosure.

FIG. 3 illustrates a block diagram of a relationship recovery module (RRM) in accordance with embodiments of the disclosure. As illustrated, RRM 102 comprises a plurality of sub-modules 302, 311, 312 and may comprise up to a N number of sub-modules. Each of these sub-modules are configured to perform a series of computations and the sub-modules may be set up to conduct all their computations concurrently or individually. In other words, the sub-modules may be configured to perform their computations in parallel such that up to a N number of bounding boxes may be concurrently processed and projected to their corresponding score map cells in a 3D confidence score map.

Figure 4:
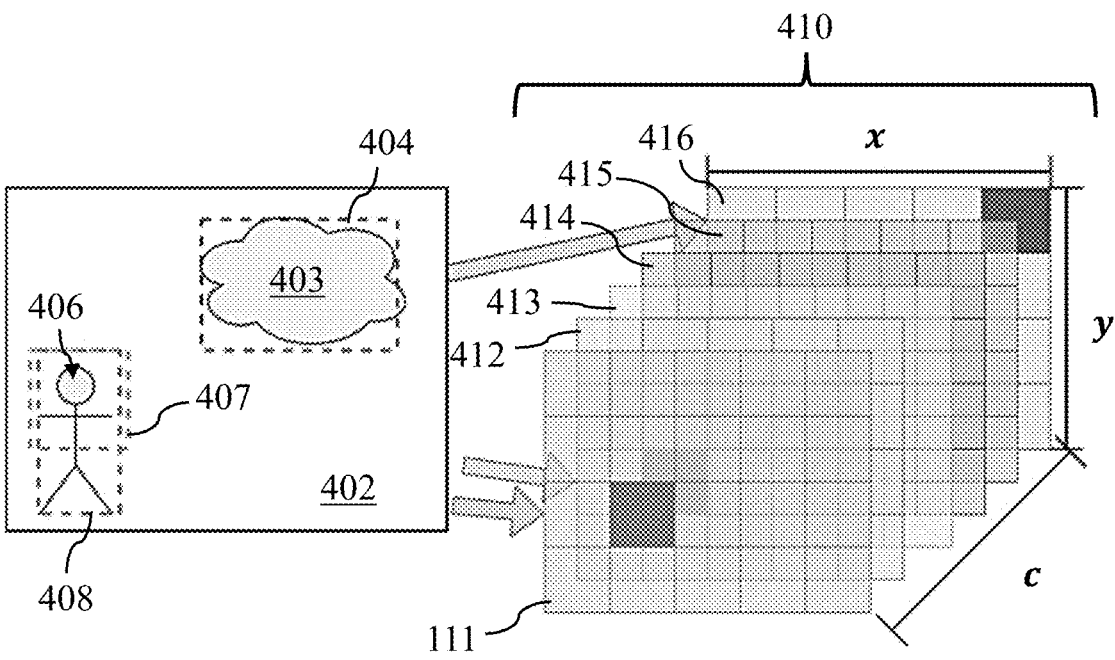
FIG. 4 illustrates a block diagram representative of the projection of bounding boxes from an image onto a three-dimensional confidence score map in accordance with embodiments of the present disclosure.

Exemplary projections of bounding boxes to corresponding score map cells in a 3D confidence score map is illustrated in FIG. 4. As can be seen in FIG. 4, image 402 comprises of two objects, objects 403 and 406. Bounding box 404 has been generated to enclose object 403 and bounding boxes 407 and 408 were generated to enclose object 406. The generation of bounding boxes to enclose objects within an image are omitted for brevity in this description as the generation of such bounding boxes by object detection models are well known to one skilled in the art.

In this example, confidence score map 410 comprises of six channels, i.e., channels 411-416 whereby each channel corresponds to a specific combination of a bounding box's different scales $s_0$ and ratios $r_0$ (i.e., channel c), and each score map cell on each channel contains the confidence score (i.e., cell value) of a bounding box and a spatial location (i.e. x and y on the map) of a bounding box. It should be noted that the scale and ratio of a bounding box may be obtained from the dimensions of the bounding box where the scale of the bounding box is defined as the height of the box multiplied by its width, and the ratio of the bounding box is defined as the height of the box divided by its width. Bounding boxes 404, 407 and 408 are then projected to score map cells on the 3D confidence score map based on the dimensions of the bounding box (which are used to obtain the scale and ratio of the bounding box), the confidence score and the spatial location of each respective bounding box, and a down sampling ratio of the 3D confidence score map. One skilled in the art will recognize that the 3D confidence score map may comprise of any number of channels without departing from this disclosure and that the illustration shown in FIG. 4 is by way of example only.

With reference to FIG. 3, when a sub-module in RRM 102, such as sub-module 302, receives a confidence score, the dimensions and a spatial location associated with a bounding box, the sub-module will process this data using spatial recovery modules 304 and 306. During this processing step, spatial recovery modules 304 and 306 will compute a spatial location for the bounding box (i.e., the spatial location of a score map cell) on a channel of the 3D confidence score map based on the spatial location of the bounding box and the down sampling ratio of the 3D confidence score map. In embodiments of the disclosure, spatial recovery module 304 is configured to compute the width and the height of the bounding box and this information is then provided to spatial recovery module 306 and channel recovery module 308. Spatial recovery module 306 then utilizes this information to compute the spatial location of the bounding box on a score map cell.

In embodiments of the disclosure, a spatial location (x, y) for the bounding box on the channel of the 3D confidence score map may be computed based on a central location of the bounding box $[X_c, Y_c]$ and the down sampling ratio $\beta$ of the 3D confidence score map as follows:

$$x = \left[\frac{X_C}{\beta}\right] \qquad \text{equation (1)}$$

$$y = \left[\frac{Y_C}{\beta}\right] \qquad \text{equation (2)}$$

In addition to spatial recovery modules 304 and 306, RRM 102 also comprises channel recovery module 308 which is configured to determine a channel of the 3D confidence score map onto which the bounding box is to be projected on. In embodiments of the invention, channel recovery module 308 is configured to project the bounding box to a channel $c(s_0, r_0)$, whereby this channel was selected as this channel's scale $s_0$ and ratio $r_0$ had the nearest Euclidean distances to the scale s' and ratio r' of the bounding box. The scale s' and ratio r' of the bounding box may be computed based on the width w' and height h' of the bounding box as follows:

$$s' = w' \times h' \qquad \text{equation (3)}$$

$$r' = \frac{h'}{w'} \qquad \text{equation (4)}$$

In embodiments of the disclosure, the width of a channel in the 3D confidence score map may be defined as $[W/\beta]$ and the height of the channel may be defined as $[H/\beta]$, where W and H are the width and the height of the image respectively.

The results obtained from channel recovery module 308 and spatial recovery modules 304 and 306, which comprise the score assigned to the bounding box, the channel, and the spatial location (x, y) for the bounding box (i.e., the spatial location of a score map cell) on the channel of the 3D confidence score map, are then projected onto the 3D confidence score map and this 3D confidence score map is then provided to KICU 104.

As mentioned in the previous sections, RRM 102 may comprise a plurality of sub-modules 302 (e.g., sub-modules 311, 312 up to an N number of submodules). Each of these sub-modules has their own spatial and channel recovery modules, and each sub-module is configured to receive a confidence score, the dimensions and a spatial location associated with a bounding box and based on this information, to then obtain, using the spatial and channel recovery modules contained within each sub-module, the channel, and the spatial location (x, y) for the bounding box (i.e., the spatial location of a score map cell) on the channel of the 3D confidence score map. The output data from all these sub-modules together with the corresponding confidence score assigned to each bounding box may then be projected onto the 3D confidence score map and this 3D confidence score map is then provided concurrently or singularly to KICU 104.

A block diagram of a kernel index compute unit (KICU) in accordance with embodiments of the present disclosure is illustrated in FIG. 5. As shown, KICU 500 comprises Single-Channel sub-module 502, Cross-Ratio sub-module 504. Cross-Scale sub-module 506, Cross-all-Channels sub-module 508 and padding module 510. For ease of reference, Single-Channel sub-module 502, Cross-Ratio sub-module 504. Cross-Scale sub-module 506 and Cross-all-Channels sub-module 508 may collectively be referred to as the suppression-sub-modules. In embodiments of the disclosure, KICU 500 may be provided with a plurality of sub-modules that are each configured to perform a series of computations concurrently or individually. In other words, the sub-modules may be configured to perform their computations in parallel such that up to a N number of regions and their corresponding score map cells may be mapped concurrently.

In embodiments of the disclosure, Single-Channel sub-module 502 may be configured to perform a MaxPool operation on every single channel in the 3D confidence score map individually—based on different kernel sizes and different stride dimensions for each channel. Such an embodiment is illustrated in FIG. 6(*a*).

In further embodiments of the disclosure, Cross-Ratio sub-module 504 may be configured to concatenate score map cells of channels that have a similar scale to form a plurality of scale-concatenated channels before the MaxPool operation is performed on the plurality of scale-concatenated channels. Such an embodiment is illustrated in FIG. 6(*b*).

In further embodiments of the disclosure, Cross-Scale sub-module 506 may be configured to concatenate score map cells of channels that have a similar ratio to form a plurality of ratio-concatenated channels before the MaxPool operation is performed on the plurality of ratio-concatenated channels. Such an embodiment is illustrated in FIG. 6(*c*).

In further embodiments of the disclosure, Cross-all-Channels sub-module 508 may be configured to partition each of the channels in the 3D confidence score map into regions before performing the MaxPool operation on each of the channels. Such an embodiment is illustrated in FIG. 6(*d*).

As known to one skilled in the art, a MaxPool operation is a type of pooling operation commonly used in convolutional neural networks for feature extraction and dimensionality reduction. During a MaxPool operation, a kernel moves across a feature map such as a channel of a 3D confidence score map in fixed strides and at each position, the maximum value within the region covered by the kernel is selected and propagated to an output feature map.

In embodiments of the disclosure, upon receiving the 3D confidence score map onto which the bounding boxes have been projected on from RMM 102, KICU 500 may utilize Single-Channel sub-module 502 to partition each channel of the 3D confidence score map into a plurality of regions. The dimensions of the regions in each channel are formed to be dissimilar or different from dimensions of regions in other channels of the 3D confidence score map. In other words, each channel within the 3D confidence score map will have regions of different sizes compared to those in other channels within the map. However, it should be noted that the dimensions of the regions will be constant across each channel. This ensures that each channel is able to cover different spatial characteristics.

Each region in each of the channels of the 3D confidence score map is then mapped to a corresponding kernel index (i.e., physical memory address) in the data buffers or the SMMs. Single-Channel sub-module 502 then proceeds to store at the corresponding kernel index mapped to the region, a score map cell that has the highest score in the region. This step is then repeated across all the regions in each channel of the 3D confidence score map. It should be noted that each score map cell would contain the confidence score, the channel, and the spatial location (x, y) of the score map cell and all this information would be stored at the kernel indices of the data buffers or SMMs. The mapping and storing of score map cells with the highest score in a region in data buffers or SMMs 110 or 108 is illustrated in the example shown in FIG. 7(*a*).

Figure 7A:
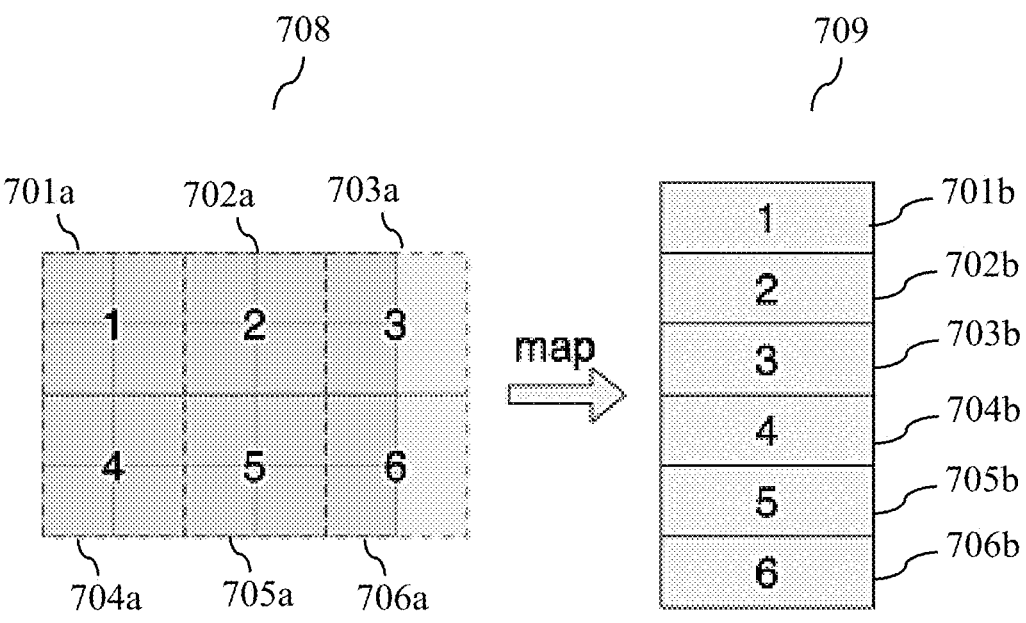
FIG. 7(*a*) illustrates the mapping operations of score map cells having the same identity into a corresponding kernel index in the data buffers in accordance with embodiments of the present disclosure.
Figure 7B:
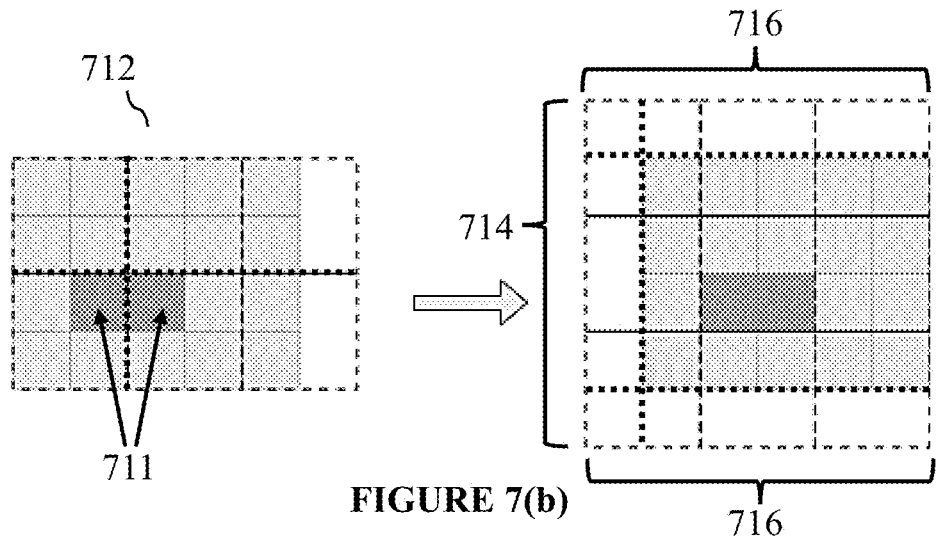

As illustrated in FIG. 7(*a*), each of regions 701*a*-706*a* in channel 708 are mapped to corresponding kernel indices 701*b*-706*b* respectively in data buffer 709, e.g., region 701*a* is mapped to kernel index 701*b*. However, only a score map cell that has the highest score in each region will be stored in the corresponding kernel index. For example, if region 705*a* comprises four score map cells having values {1, 2, 3, 5}, only the score map cell having the highest score, i.e. "5", will be stored in the corresponding kernel index 705*b*. For the avoidance of doubt, if all the score map cells in a region have the same values {1, 1, 1, 1}, or if two or more score map cells in a region have the same highest values {0, 1, 0, 1}, the highest score amongst these scores would be "1" and as such, any one of these score map cells having the value "1" within this region may be selectively stored in the corresponding kernel index.

With reference to FIG. 5, in embodiments of the disclosure, KICU 500 may be configured to retrieve score map cells stored within the kernel indices of the data buffers or SMMs. To recap, each score map cell would contain the confidence score, the channel at which the score map cell is located, and the spatial location (x, y) of the score map cell and all this information may be used by KICU 500 to generate a new 3D confidence score map. KICU 500 may then utilize Cross-Ratio sub-module 504 to concatenate all the channels of the 3D confidence score map that each have a similar scale to form a plurality of scale-concatenated channels. Once this is done, each of the scale-concatenated channels will be associated with a scale of a channel of the 3D confidence score map. KICU 500 then proceeds to partition each of the scale-concatenated channels into uniformly sized regions.

Each region in each of the scale-concatenated channels of the 3D confidence score map is then mapped to a corresponding kernel index (i.e., physical memory address) in the data buffers or the SMMs. Cross-Ratio sub-module 504 then proceeds to store at the corresponding kernel index mapped to the region, a score map cell that has the highest score in the region. This step is then repeated across all the regions in each scale-concatenated channel of the 3D confidence score map.

In embodiments of the disclosure, KICU 500 may retrieve score map cells stored within the kernel indices of the data buffers or SMMs to generate a new 3D confidence score map. KICU 500 may then utilize Cross-Scale sub-module 506 to concatenate all the channels of the 3D confidence score map that each have a similar ratio to form a plurality of ratio-concatenated channels. Once this is done, each of the ratio-concatenated channels will be associated with a ratio of a channel of the 3D confidence score map. KICU 500 then proceeds to partition each of the ratio-concatenated channels into uniformly sized regions.

Each region in each of the ratio-concatenated channels of the 3D confidence score map is then mapped to a corresponding kernel index (i.e., physical memory address) in the data buffers or the SMMs. Cross-Scale sub-module 504 then proceeds to store at the corresponding kernel index mapped to the region, a score map cell that has the highest score in the region. This step is then repeated across all the regions in the ratio-concatenated channels of the 3D confidence score map.

In embodiments of the disclosure, KICU 500 may retrieve score map cells stored within the kernel indices of the data buffers or SMMs to generate a new 3D confidence score map. KICU 500 may then utilize Cross-all-Channels sub-module 508 to partition each of the channels of the 3D confidence score map into uniformly sized regions.

Each region in each of the channels of the 3D confidence score map is then mapped to a corresponding kernel index (i.e., physical memory address) in the data buffers or the SMMs. Cross-all-Channels sub-module 508 then proceeds to store at the corresponding kernel index mapped to the region, a score map cell that has the highest score in the region. This step is then repeated across all the regions of all the channels of the 3D confidence score map.

In embodiments of the disclosure, KICU 500 may retrieve score map cells stored within the kernel indices of the data buffers or SMMs to generate a padded 3D confidence score map. In order to generate the padded 3D confidence score map, KICU 500 utilizes padding module 510 to first generate a new 3D confidence score map based on the retrieved score map cells. Padding module 510 then pads the score map cells at the border of each of the channels of the newly generated 3D confidence score map with zeroes. By doing so, KICU 500 is able to effectively address the edge effect problems thereby further reducing the effect of overlapping boxes. The padding of the score map cells of the border of each of the channels is illustrated in the example shown in FIG. 7(*b*).

As illustrated in FIG. 7(*b*), part of a channel is shown as channel-part 712. In this illustration, channel-part 712 contains cells 711 that have high scores—indicating that there is strong likelihood that two overlapping boxes are present at these spatial locations. However, as cells 711 are located in two different regions (whereby each region is made up of 2×2 squares), this implies that these two cells will be mapped to two kernel indices. This is not ideal as this means that neither overlapping box will be eliminated. In order to increase the sparsity of the score map, score map cells 714, 716 and 718 at the border of channel-part 712 are padded with zeroes. By doing so, cells 711 are now contained within a single region and only one of these cells will be mapped to a single kernel index within the data buffer thereby effectively eliminating one of the overlapping boxes.

Figure 8:
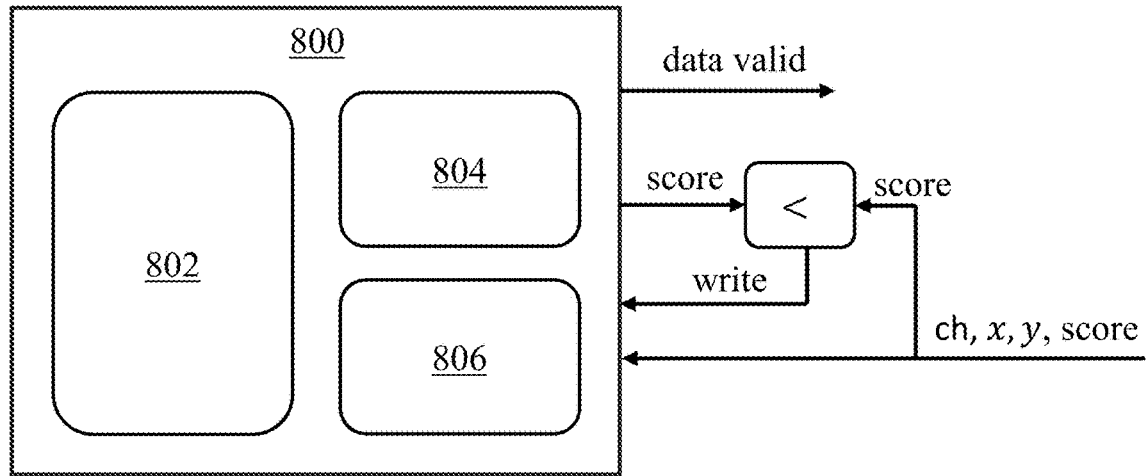
FIG. 8 illustrates a block diagram of a data buffer in accordance with embodiments of the present disclosure.

FIG. 8 illustrates a block diagram of a data buffer or a SMM in accordance with embodiments of the disclosure. Data buffer 800 comprises memory bank 802 which are used to store the score map cells, read group logic module 804 and memory control module 806. In operation, if a new score map cell mapped to a kernel index at memory bank 802 has a higher score than an old score map cell stored at the same index, memory control module 806 will replace the old score map cell with the new one. Conversely, if the new score map cell mapped to a kernel index at memory bank 802 has a lower score than the old score map cell stored at the same index or if both score map cells have an equal score, memory control module 806 will keep the old score map cell. When required, these score map cells stored at memory bank 802 may be retrieved by the KICUs.

Figure 9:
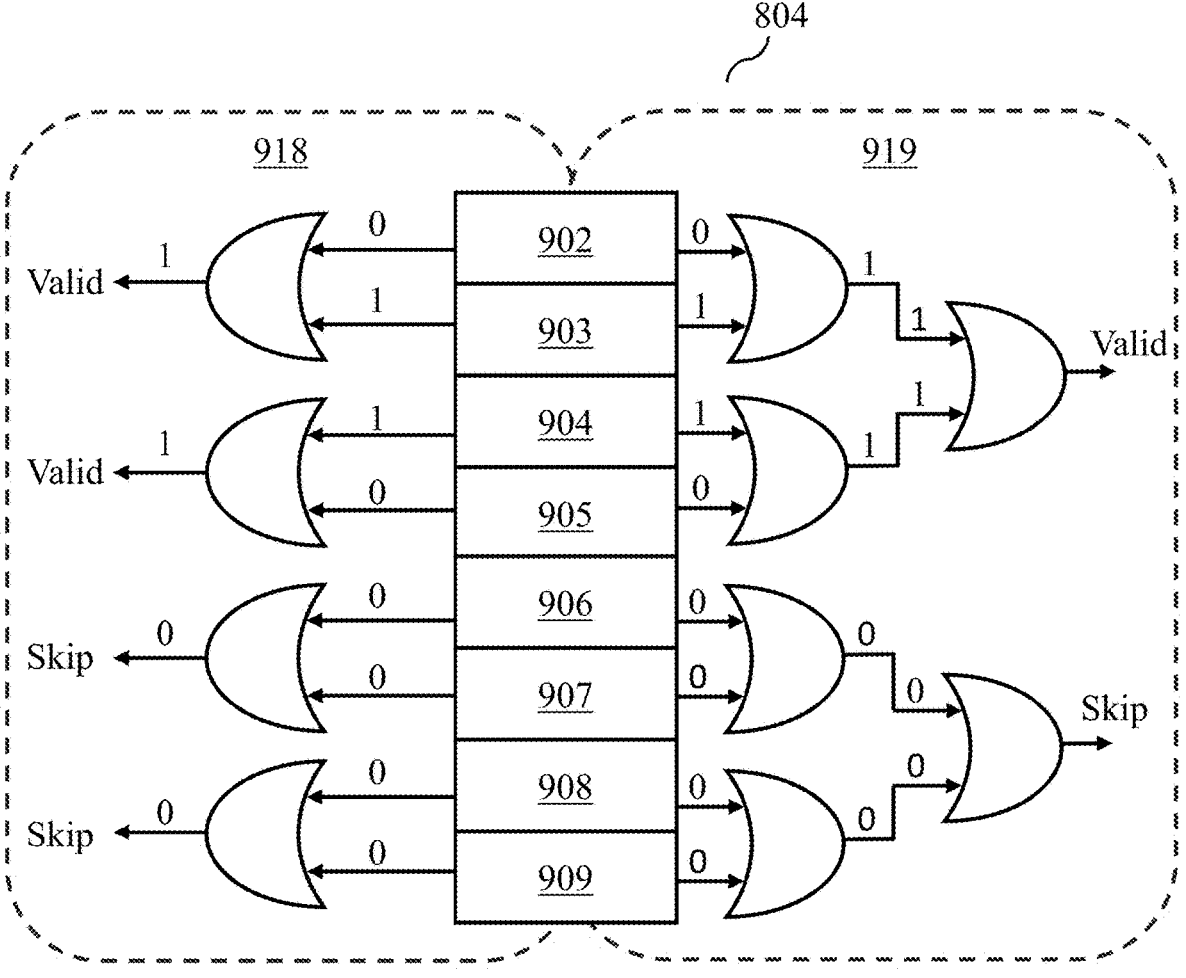
FIG. 9 illustrates a block diagram of a read group logic module in accordance with embodiments of the present disclosure.

In operation, less than 1% of memory bank 802 is used to store valid information of the score map cells as the channels usually contain highly sparse information. Therefore, data buffer 800 utilizes read group logic module 804 which comprises of or-gate trees to skip or jump through the invalid memory cells when these memory cells are accessed thereby greatly improving the read efficiency of the data buffer. A block diagram of the read group logic module is illustrated in FIG. 9.

As shown in this figure, read group logic module 804 comprises of two different or-tree arrangements: or-tree arrangement 918 and or-tree arrangement 919 which are both connected to memory cells 902-909 whereby the validity of each of these memory cells are set out adjacent each of these cells. For example, memory cell 902 contains a "0" as such it is considered as an invalid cell while memory cell 903 contains a "1" and as such is a valid memory cell. The or-gate trees in each of these arrangements are then checked sequentially and if the read group is found to be valid, all the cells in this group will then be read by date buffer 800 otherwise, the cells in this group will be skipped and data buffer 800 will then proceed to read the next group. In or-tree arrangement 918, it can be seen that memory cells 902-905 will be read sequentially as these cells are in two valid read groups, i.e., cells 902 and 903 are grouped together and cells 904 and 905 are grouped together, while memory cells 906-909 will be skipped as these cells are in invalid read groups.

As for or-tree arrangement 919, four neighboring memory cells, i.e., cells 902-905 and 906-909 are grouped into two groups whereby the cells in the first group (memory cells 902-905) are read sequentially as they are located in a valid read group while the cells in the second group (memory cells 906-909) are skipped as they were found to be in an invalid read group. By grouping the memory cells in such a manner, read group logic module 804 is able to accelerate the access rate of valid memory cells in the data buffer.

Figure 10:
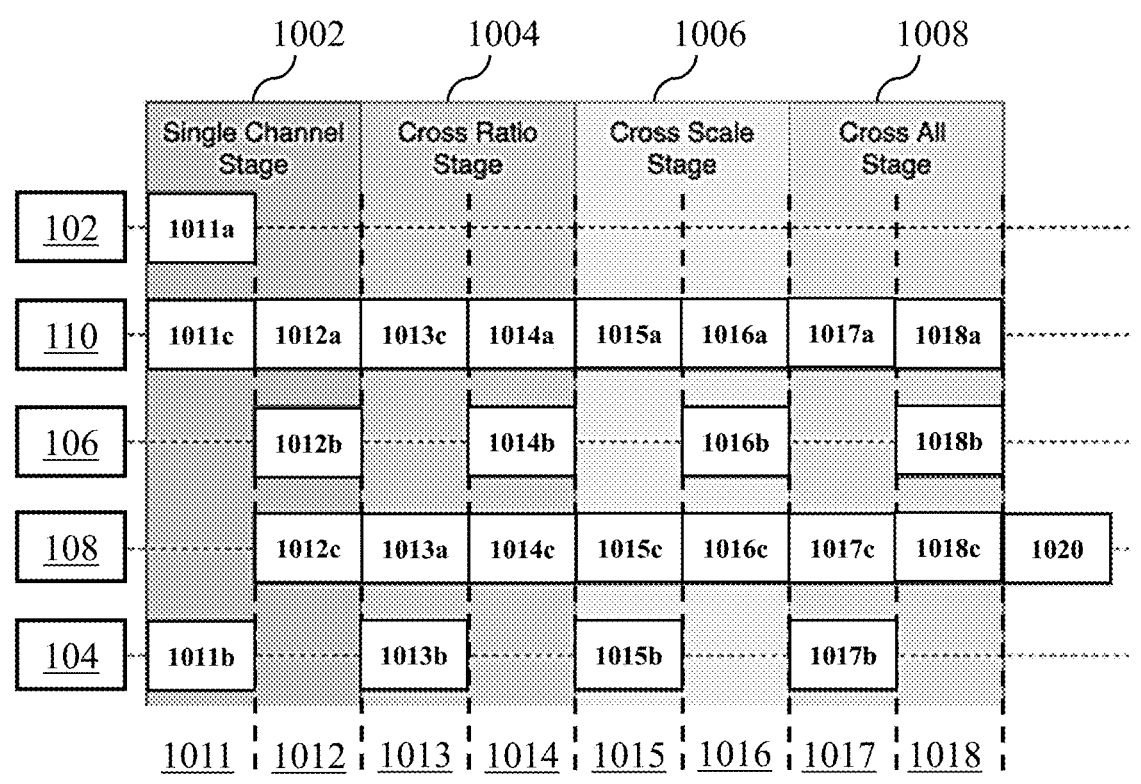
FIG. 10 illustrates a timing diagram showing the full operation of the acceleration circuitry in accordance with embodiments of the present disclosure.

A timing diagram showing the full operation of acceleration circuit 100 (as illustrated in FIG. 1) is shown in FIG. 10 in accordance with embodiments of the present disclosure. Reference is also made in this section to the modules shown in FIG. 1 for illustration purposes.

At time-step 1011, each sub-module within relationship recovery module (RRM) 102 will receive a unique bounding box associated with detected features within the image. During process 1011a, each sub-module within RRM 102 will project the received bounding box to a score map cell in a first-stage three-dimensional confidence score map based on dimensions, a confidence score and a spatial location of the bounding box, and a down sampling ratio of the first-stage three-dimensional confidence score map. The first-stage three-dimensional confidence score map is then provided to kernel index compute unit (KICU) 104. During process 1011b, KICU 104 will partition each channel of the first-stage three-dimensional confidence score map into a plurality of regions, whereby dimensions of regions in each channel are different from dimensions of regions in other channels of the first-stage three-dimensional confidence score map. Each region in each of the channels of the first-stage three-dimensional confidence score map is then mapped to a corresponding kernel index in score map memory (SMM) 110 and this takes place at process 1011c.

At time-step 1012, for each region in each of the channels, SMM 110 will then store at each corresponding kernel index mapped to the region, a score map cell that has the highest score in the region. This takes place in process 1012a. During process 1012b, KICU 106 will then retrieve the stored score map cells from SMM 110 and will form a padded post first-stage three-dimensional confidence score map based on the retrieved score map cells. Each channel of the padded post first-stage three-dimensional confidence score map is then partitioned into regions. Each region in each of the channels of the padded post first-stage three-dimensional confidence score map is then mapped to a corresponding kernel index in SMM 108, and this takes place at process 1012c.

At time-step 1013, for each region in each of the channels, SMM 108 will then store at each corresponding kernel index mapped to the region, a score map cell that has the highest score in the region. This takes place in process 1013a. During process 1013b, KICU 104 will then retrieve the stored score map cells from SMM 110 and will generate a second-stage three-dimensional confidence score map based on the retrieved score map cells. Channels of the second-stage three-dimensional confidence score map that each have a similar scale are then concatenated together to form a plurality of scale-concatenated channels, wherein each scale-concatenated channel is associated with a scale of a channel of the second-stage three-dimensional confidence score map. Each of the plurality of scale-concatenated channels are the partitioned into regions. Each region in each of the plurality of scale-concatenated channels is then mapped to its corresponding kernel index in SMM 110 and this takes place at process 1013c.

At time-step 1014, for each region in each of the channels, SMM 110 will then store at each corresponding kernel index mapped to the region, a score map cell that has the highest score in the region. This takes place in process 1014a. During process 1014b, KICU 106 will then retrieve the stored score map cells from SMM 110 and will form a padded post second-stage three-dimensional confidence score map based on the retrieved score map cells. Each channel of the padded post second-stage three-dimensional confidence score map is then partitioned into regions. Each region in each of the channels of the padded post second-stage three-dimensional confidence score map is then mapped to a corresponding kernel index in SMM 108, and this takes place at process 1014c.

At time-step 1015, for each region in each of the channels, SMM 110 will then store at each corresponding kernel index mapped to the region, a score map cell that has the highest score in the region. This takes place in process 1015a. During process 1015b, KICU 104 will then retrieve the stored score map cells from SMM 110 and will generate a third-stage three-dimensional confidence score map based on the retrieved score map cells. Channels of the third-stage three-dimensional confidence score map that each have a similar ratio are then concatenated together to form a plurality of ratio-concatenated channels, wherein each ratio-concatenated channel is associated with a ratio of a channel of the third-stage three-dimensional confidence score map. Each of the plurality of ratio-concatenated channels are subsequently partitioned into regions. Each region in each of the plurality of ratio-concatenated channels is then mapped to its corresponding kernel index in SMM 110 and this takes place at process 1015c.

At time-step 1016, for each region in each of the channels, SMM 110 will then store at each corresponding kernel index mapped to the region, a score map cell that has the highest score in the region. This takes place in process 1016a. During process 1016b, KICU 106 will then retrieve the stored score map cells from SMM 110 and will form a padded post third-stage three-dimensional confidence score map based on the retrieved score map cells. Each channel of the padded post third-stage three-dimensional confidence score map is then partitioned into regions. Each region in each of the channels of the padded post third-stage three-dimensional confidence score map is then mapped to a corresponding kernel index in SMM 108, and this takes place at process 1016c.

At time-step 1017, for each region in each of the channels, SMM 110 will then store at each corresponding kernel index mapped to the region, a score map cell that has the highest score in the region. This takes place in process 1017a. During process 1017b, KICU 104 will then retrieve the stored score map cells from SMM 110 and will generate a fourth-stage three-dimensional confidence score map based on the retrieved score map cells. Each of the channels of the fourth-stage three-dimensional confidence score map is then subsequently partitioned into regions. Each region in each of the plurality of ratio-concatenated channels is then mapped to its corresponding kernel index in SMM 110 and this takes place at process 1017c.

At time-step 1018, for each region in each of the channels, SMM 110 will store at each corresponding kernel index mapped to the region, a score map cell that has the highest score in the region. This takes place in process 1018a. During process 1018b, KICU 106 will then retrieve the stored score map cells from SMM 110 and will form a padded post fourth-stage three-dimensional confidence score map based on the retrieved score map cells. Each channel of the padded post fourth-stage three-dimensional confidence score map is then partitioned into regions. Each region in each of the channels of the padded post fourth-stage three-dimensional confidence score map is then mapped to a corresponding kernel index in SMM 108, and this takes place at process 1018c.

Finally, during process 1020, accelerator circuit 100 then proceeds to utilize the score map cells stored in SMM 108 to at least in part, accelerate detection of objects in the image. It should also be noted that time-steps 1011 and 1012 correspond to functions performed by a Single-Channel sub-module 1002, time-steps 1013 and 1014 correspond to functions performed by a Cross-Ratio sub-module 1004, time-steps 1015 and 1016 correspond to functions performed by a Cross-Scale sub-module 1006, and time-steps 1017 and 1018 correspond to functions performed by a Cross-all-Channels sub-module 1008.

Figure 11:
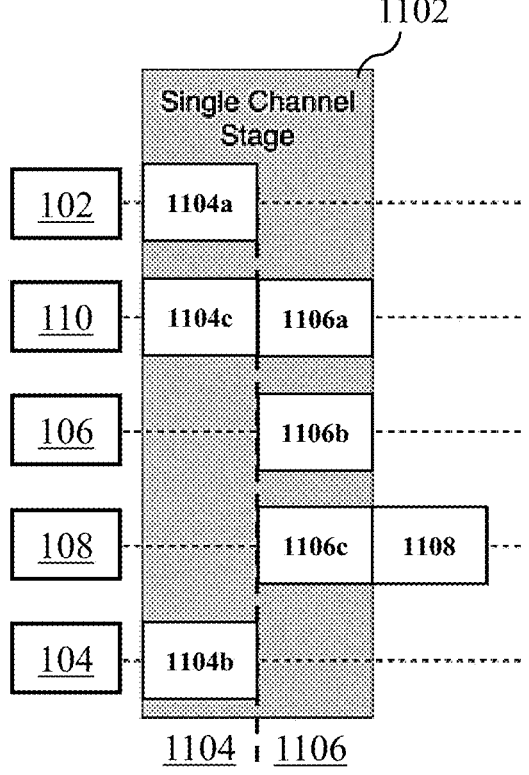
FIG. 11 illustrates a timing diagram showing the partial operation of the acceleration circuitry in accordance with embodiments of the present disclosure.

A timing diagram showing the partial operation of acceleration circuit 100 (as illustrated in FIG. 1) is shown in FIG. 11 in accordance with embodiments of the present disclosure. Similar to the sections above, reference is made in this section to the modules shown in FIG. 1 for illustration purposes. It should also be noted that when reference is made herein to the partial operation of acceleration circuit 100, this implies that acceleration circuit 100 is configured to only utilize a single suppression module in the KICU and that is the Single-Channel sub-module as described in the following section.

At time-step 1104, each sub-module within relationship recovery module (RRM) 102 will receive a unique bounding box associated with detected features within the image. During process 1104*a*, each sub-module within RRM 102 will project the received bounding box to a score map cell in a first-stage three-dimensional confidence score map based on dimensions, a confidence score and a spatial location of the bounding box, and a down sampling ratio of the first-stage three-dimensional confidence score map. The first-stage three-dimensional confidence score map is then provided to kernel index compute unit (KICU) 104. During process 1104*b*, KICU 104 will partition each channel of the first-stage three-dimensional confidence score map into a plurality of regions, whereby dimensions of regions in each channel are different from dimensions of regions in other channels of the first-stage three-dimensional confidence score map. Each region in each of the channels of the first-stage three-dimensional confidence score map is then mapped to a corresponding kernel index in score map memory (SMM) 110 and this takes place at process 1104*c*.

At time-step 1106, for each region in each of the channels, SMM 110 will then store at each corresponding kernel index mapped to the region, a score map cell that has the highest score in the region. This takes place in process 1106*a*. During process 1106*b*, KICU 106 will then retrieve the stored score map cells from SMM 110 and will form a padded post first-stage three-dimensional confidence score map based on the retrieved score map cells. Each channel of the padded post first-stage three-dimensional confidence score map is then partitioned into regions. Each region in each of the channels of the padded post first-stage three-dimensional confidence score map is then mapped to a corresponding kernel index in SMM 108, and this takes place at process 1106*c*.

Finally, during process 1108, accelerator circuit 100 then proceeds to utilize the score map cells stored in SMM 108 to at least in part, accelerate detection of objects in the image. It should also be noted that time-steps 1104 and 1106 correspond to functions performed by a Single-Channel sub-module 1102.

Numerical Simulation

In this section, the design matrices are discussed, and the execution times of an accelerator circuitry designed in accordance with embodiments of the proposed disclosure in different configurations are simulated using a Verilator simulator with Verilog code generated by a hardware construction language such as Chisel and collected in Python scripts. The generated Verilog code is then synthesized by Cadence Genus with a Foundry 28 nm FD-SOI technology node and its memory area was estimated with a Cross-Approximate Circuit Transistor-Level Simulator 7.0 (CACTI 7.0) tool. The experimental setup and design tools used in this simulation are shown below in Table 1.

TABLE 1

| Design Tools | |
| --- | --- |
| HDL | Chisel |
| Verilog simulator | Verilator |
| Logic synthesis | Cadence Genus |
| Floorplan | Cadence Innovus |
| Design Parameters | |
| Parallelism | 1/2/4/8 |
| # Mem Banks | 1/2/4/8 |
| # Grouped Mem Cells | 1/2/4/8/16 |
| Bit width | 8/16/20/32 bit |
| Image resolution | 480p/720p/1080p/2k/4k |
| Technology node | Foundry 28 mm FD-SOI |
| Supply voltage | 0.8 V |

A. Detection Accuracy.

Table 2 below summarizes the mean Average Precision (mAP) of the accelerator circuit when the scores and spatial location bit width are varied. Intuitively, better precision yields higher mAP. The 32-bit accelerator circuit was found to be 1.07% less than GreedyNMS in ResNet-50 and was 0.03% higher than GreedyNMS in ResNet-152. It was found that the difference in performance of the accelerator circuit in ResNet-50 was caused mainly by the difference in data format and precision-IEEE 754 in the software implementations and 32-bit fixed-point in the accelerator circuit.

TABLE 2

| Detection pipeline | GreedyNMS | Accelerator circuit Score and Box bit width | | |
| --- | --- | --- | --- | --- |
| | | 32 | 16 | 8 |
| Faster-RCNN ResNet-50 | 78.40 | 77.33 | 77.30 | 77.11 |
| Faster-RCNN ResNet-152 | 78.70 | 78.73 | 78.59 | 78.40 |

B. Execution Time.

Figure 12:
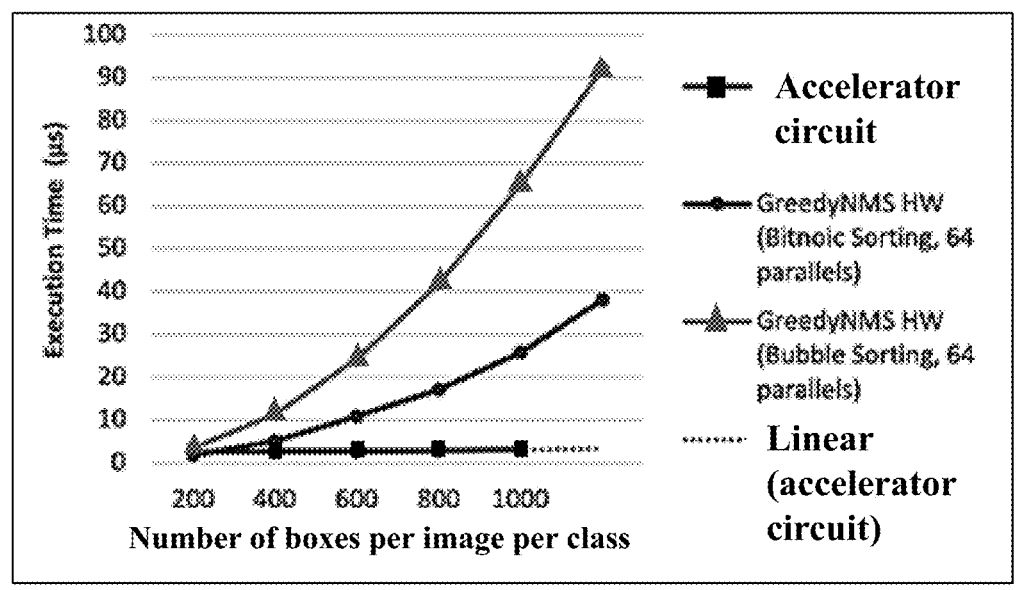
FIG. 12 illustrates execution times of a full acceleration circuit, and GreedyNMS hardware with Bubble and Bitonic sorting algorithms when the number of bounding boxes per image per class is varied.

FIG. 12 illustrates the execution cycles of an accelerator circuit whose execution time has a linear trend with the number of bounding boxes and a 64-parallel GreedyNMS hardware utilizing Bubble and Bitonic sorting algorithms (sorting is a key component in GreedyNMS). As shown in this figure, the performance of the accelerator circuit increasingly outperforms GreedyNMS hardware even when the number of boxes increases. Table 3 below sets out the speedup of the clustering of 1000 and 8000 bounding boxes for state-of-the-art NMS algorithms and the accelerator circuit. In this table, the state-of-the-art NMS algorithms are the NMS algorithms cited in the publication titled "A fast and power-efficient hardware architecture for non-maximum suppression," by M. Shi et al., and as published in TCAS-II, vol. 66, no. 11, pp. 1870-1874, in the year 2019.

TABLE 3

| Method | NMS execution time (μs) | | Speedup | | Area |
|---|---|---|---|---|---|
| | n = 1,000 | n = 8,000 | n = 1,000 | n = 8,000 | |
| GreedyNMS | 35,000 | 512,000 | 1x | 1x | — |
| GPU-NMS v2 | 324 | — | 108.02x | — | — |
| State of the art NMS | 12.79 | 102.32 | 2,736.51x | 5,003.91x | 0.080 |
| Accelerator circuit    Minimal area | 9.26 | 22.25 | 3,781.67x | 23,011.24x | 0.032 |
| Best performance | 1.70 | 5.70 | 20,629.19x | 89,824.56x | 0.096 |

Figure 13:
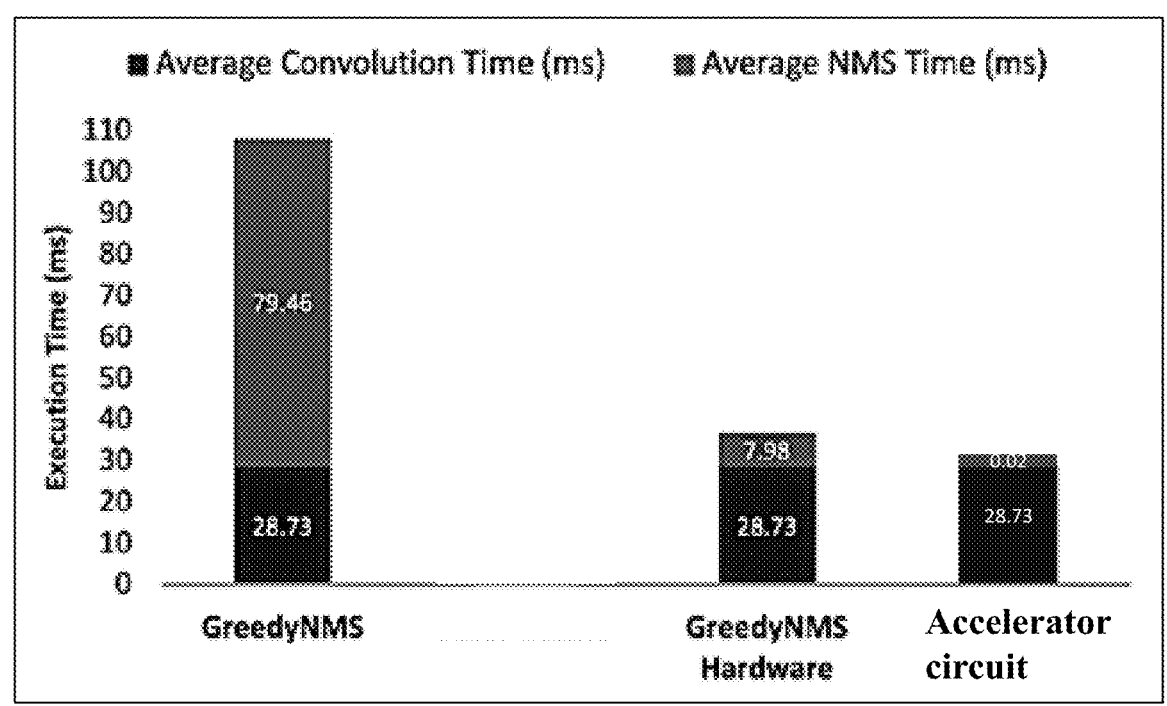
FIG. 13 illustrates the timing breakdown of object detection inference time executed on A100 and NMS time of GreedyNMS, GreedyNMS hardware based on Bitonic sorting algorithm, 1-way 1-bank full acceleration circuitry having 8 memory cells in on read group and operated at 400 MHz.

At the system level, it can be seen that the accelerator circuit was able to achieve 120.95× to 669.48× speedup compared to with GreedyNMS hardware that was executed on Faster-RCNN backbone on the PASCAL VOC benchmarking dataset where the execution time of the system includes the convolution operations and NMS. FIG. 13 illustrates the timing breakdown of object detection inference time as executed on an A100 processor and NMS time of GreedyNMS, GreedyNMS hardware based on Bitnoic sorting algorithm, and a 1-way 1-bank full acceleration circuitry having 8 memory cells in on read group and operated at 400 MHz. As can be seen, the accelerator circuitry was able to greatly alleviate the performance bottleneck caused by de facto GreedyNMS.

C. Hardware Utilization.

The accelerator circuit with minimal area and best performance which support up to 480p VGA image resolution are synthesized by Cadence Genus targeted on Foundry 28 nm FD-SOI manufacturing process, and the Place and Route (PnR) are done by Cadence Innovus. The area of the memory is estimated by the CACTI 7.0 software. The area of the accelerator circuit with minimal area after PnR was found to be only 0.031 mm², which is only 38.75% of the chip area proposed by state-of-the-art NMS hardware solutions. The layout and the specification of the chip with minimal area are illustrated in FIGS. 14(a) and 14(b), and the layout and specification of the chips with the best performance are illustrated in FIGS. 15(a) and 15(b) respectively where the black boxes in FIGS. 14(a) and 15(b) represent the SRAMs in the SMMs.

Figure 16:
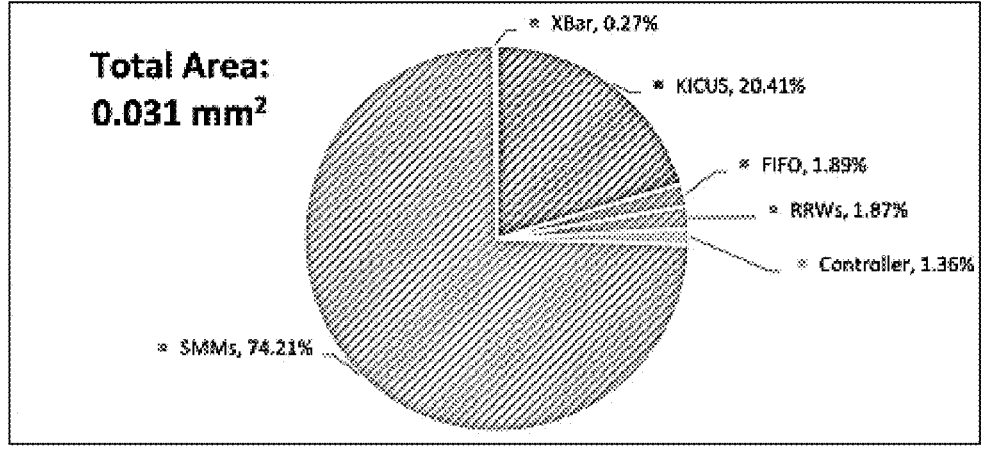
FIG. 16 illustrates the area breakdown of an 8-bit 1-sub-module 1-bank accelerator circuit with 8 memory cells in one read group that supports VGA image resolution.
Figure 17:
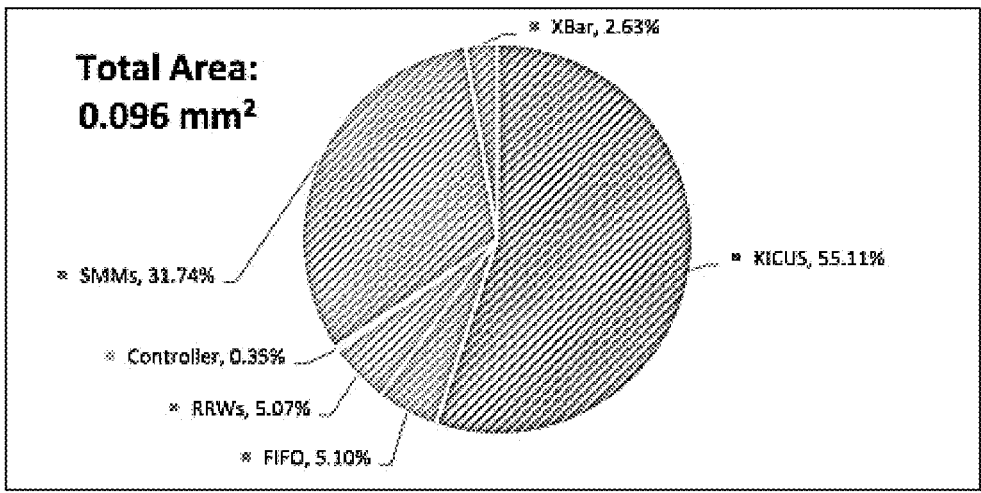
FIG. 17 illustrates the area breakdown of an 8-bit 8-sub-module 8-bank accelerator circuit with 4 memory cells in one read group that supports VGA image resolution.

The area breakdown of an 8-bit 1-sub-module 1-bank accelerator circuit with 8 memory cells in one read group that supports VGA image resolution is illustrated in FIG. 16 and the area breakdown of an 8-bit 8-sub-modules 1-bank accelerator circuit with 8 memory cells in one read group that supports VGA image resolution is illustrated FIG. 17. As can be seen from these figures, in the minimal area design shown in FIG. 16, the Score Map Memories occupy more than 74% of the area in the accelerator circuit. As for the best performance design, the SMMs occupy about 31.74% of the area in the accelerator circuit. The Kernel Index Compute Units in the accelerator circuit in the best performance design occupies the maximum percentage of the chip area, which is 55% of the overall area.

Numerous other changes, substitutions, variations, and modifications may be ascertained by the skilled in the art and it is intended that the present application encompass all such changes, substitutions, variations, and modifications as falling within the scope of the appended claims.

The invention claimed is:

1. An accelerator circuitry for facilitating acceleration of object detection operations of an image, the circuitry comprising:

a first set of processing elements performing a plurality of first computations in parallel, each first computation comprising:

receiving a unique bounding box associated with detected features within the image, and projecting the received bounding box to a score map cell in a first-stage three-dimensional confidence score map based on dimensions, a confidence score and a spatial location of the bounding box, and a down sampling ratio of the first-stage three-dimensional confidence score map;

a second set of processing elements communicatively coupled to the first set of processing elements, and to first and second data buffers, the second set of processing elements performing a plurality of second computations comprising:

partitioning each channel of the first-stage three-dimensional confidence score map into a plurality of regions, whereby dimensions of regions in each channel are different from dimensions of regions in other channels of the first-stage three-dimensional confidence score map, mapping each region in each of the channels of the first-stage three-dimensional confidence score map to a corresponding kernel index in the first data buffer, and for each region, storing, at the corresponding kernel index mapped to the region, a score map cell that has a highest score in the region, a third set of processing elements communicatively coupled to the first and second data buffers, the third set of processing elements performing a plurality of third computations comprising:

retrieving the score map cells stored in the first data buffer, forming a padded post first-stage three-dimensional confidence score map based on the retrieved score map cells, partitioning each channel of the padded post first-stage three-dimensional confidence score map into regions, mapping each region in each of the channels of the padded post first-stage three-dimensional confidence score map to a corresponding kernel index in the second data buffer, and for each region, storing, at the corresponding kernel index mapped to the region, a score map cell that has a highest score in the region, wherein the accelerator circuitry accelerates detection of objects in the image based at least in part on the score map cells stored in the second data buffer.

2. The accelerator circuitry according to claim 1, wherein before the accelerator circuitry accelerates detection of objects in the image based at least in part on the score map cells stored in the second data buffer, the plurality of second computations performed by the second set of processing elements further comprises:

retrieving the score map cells stored in the second data buffer, generating a second-stage three-dimensional confidence score map based on the retrieved score map cells, concatenating channels of the second-stage three-dimensional confidence score map that each have a similar scale to form a plurality of scale-concatenated channels, wherein each scale-concatenated channel is associated with a scale of a channel of the second-stage three-dimensional confidence score map;

partitioning each of the plurality of scale-concatenated channels into regions, mapping each region in each of the plurality of scale-concatenated channels to its corresponding kernel index in the first data buffer, and for each region, storing, at its corresponding kernel index mapped to the region, a score map cell that has a highest score in the region, and wherein the plurality of third computations performed by the third set of processing elements further comprises:

retrieving the score map cells stored in the first data buffer, forming a padded second-stage three-dimensional confidence score map based on the retrieved score map cells, partitioning each channel of the padded post second-stage three-dimensional confidence score map into regions, mapping each region in each of the channels of the padded post second-stage three-dimensional confidence score map to its corresponding kernel index in the second data buffer, and for each region, storing, at its corresponding kernel index mapped to the region, a score map cell that has a highest score in the region.

3. The accelerator circuitry according to claim 2, whereby the plurality of second computations performed by the second set of processing elements further comprises:

retrieving the score map cells stored in the second data buffer, generating a third-stage three-dimensional confidence score map based on the retrieved score map cells, concatenating channels of the third-stage three-dimensional confidence score map that each have a similar ratio to form a plurality of ratio-concatenated channels, wherein each ratio-concatenated channel is associated with a ratio of a channel of the third-stage three-dimensional confidence score map;

partitioning each of the plurality of ratio-concatenated channels into regions, mapping each region in each of the plurality of ratio-concatenated channels to its corresponding kernel index in the first data buffer, and for each region, storing, at its corresponding kernel index mapped to the region, a score map cell that has a highest score in the region, and wherein the plurality of third computations performed by the third set of processing elements further comprises:

retrieving the score map cells stored in the first data buffer, forming a padded post third-stage three-dimensional confidence score map based on the retrieved score map cells, partitioning each channel of the padded post third-stage three-dimensional confidence score map into regions, mapping each region in each of the channels of the padded post third-stage three-dimensional confidence score map to its corresponding kernel index in the second data buffer, and for each region, storing, at its corresponding kernel index mapped to the region, a score map cell that has a highest score in the region.

4. The accelerator circuitry according to claim 3, whereby the plurality of second computations performed by the second set of processing elements further comprises:

retrieving the score map cells stored in the second data buffer, generating a fourth-stage three-dimensional confidence score map based on the retrieved score map cells, partitioning each of the channels in the fourth-stage three-dimensional confidence score map into regions, mapping each region in each of the channels to its corresponding kernel index in the first data buffer, and for each region, storing, at its corresponding kernel index mapped to the region, a score map cell that has a highest score in the region, and wherein the plurality of third computations performed by the third set of processing elements further comprises:

retrieving the score map cells stored in the first data buffer, forming a padded post fourth-stage three-dimensional confidence score map based on the retrieved score map cells, partitioning each channel of the padded post fourth-stage three-dimensional confidence score map into regions, mapping each region in each of the channels of the post fourth-stage three-dimensional confidence score map to its corresponding kernel index in the second data buffer, and for each region, storing, at its corresponding kernel index mapped to the region, a score map cell that has a highest score in the region.

5. The accelerator circuitry according to claim 4 whereby each of the channels of the padded post first-stage three-dimensional confidence score map, the padded post second-stage three-dimensional confidence score map, the padded post third-stage three-dimensional confidence score map and the padded post fourth-stage three-dimensional confidence score map comprise border score map cells padded with zeroes.

6. The accelerator circuitry according to claim 1, whereby each first computation performed by the first set of processing elements to project the received bounding box to the score map cell in the first-stage three-dimensional confidence score map comprises each first computation:

performing channel recovery on the received bounding box based on the dimensions of the bounding box to determine a channel of the first-stage three-dimensional confidence score map for the received bounding box; and performing spatial recovery on the received bounding box based on the spatial location of the receiving bounding box, and the down sampling ratio of the first-stage three-dimensional confidence score map to determine a spatial location of a score map cell on the channel of the first-stage three-dimensional confidence score map associated with the received bounding box.

7. The accelerator circuitry according to claim 6, whereby each first computation performed by the first set of processing elements to perform channel recovery on the received bounding box based on the dimensions of the bounding box comprises each first computation:

identifying a channel of the first-stage three-dimensional confidence score map to be used as the channel for the received bounding box based on Euclidean-distances of the channels of the first-stage three-dimensional confidence score map to the dimensions of the bounding box.

8. The accelerator circuitry according to claim 1, whereby kernel indices in the first and second data buffers are grouped into read groups in each data buffer, whereby kernel indices in each read group are read sequentially when it is determined that the read group contains a valid score map cell.

9. The accelerator circuitry according to claim 1, whereby kernel indices in the first and second data buffers are grouped into read groups in each data buffer, whereby kernel indices in each read group are skipped when it is determined that the read group does not contain a valid score map cell.

10. The accelerator circuitry according to claim 1 further comprising a fourth set of processing elements communicatively provided between the second and third sets of processing elements, and the first and second data buffers, the fourth set of processing elements performing a plurality of fourth computations comprising:

arbitrating kernel index conflicts at the first and second data buffers.

11. A method to facilitate acceleration of object detection operations of an image, the method comprising:

performing a plurality of first computations in parallel using a first set of processing elements, each first computation comprising the steps of:

receiving a unique bounding box associated with detected features within the image, and projecting the received bounding box to a score map cell in a first-stage three-dimensional confidence score map based on dimensions, a confidence score and a spatial location of the bounding box, and a down sampling ratio of the first-stage three-dimensional confidence score map;

performing a plurality of second computations using a second set of processing elements communicatively coupled to the first set of processing elements, and to first and second data buffers, the second set of second computations comprising the steps of:

partitioning each channel of the first-stage three-dimensional confidence score map into a plurality of regions, whereby dimensions of regions in each channel are different from dimensions of regions in other channels of the first-stage three-dimensional confidence score map, mapping each region in each of the channels of the first-stage three-dimensional confidence score map to a corresponding kernel index in the first data buffer, and for each region, storing, at the corresponding kernel index mapped to the region, a score map cell that has a highest score in the region, performing a plurality of third computations using a third set of processing elements communicatively coupled to the first and second data buffers, the third set of computations comprising the steps of:

retrieving the score map cells stored in the first data buffer, forming a padded post first-stage three-dimensional confidence score map based on the retrieved score map cells, partitioning each channel of the padded post first-stage three-dimensional confidence score map into regions, mapping each region in each of the channels of the padded post first-stage three-dimensional confidence score map to a corresponding kernel index in the second data buffer, and for each region, storing, at the corresponding kernel index mapped to the region, a score map cell that has a highest score in the region, wherein detection of objects in the image are accelerated based at least in part on the score map cells stored in the second data buffer.

12. The method according to claim 11, wherein before the method of detecting objects in the image are accelerated based at least in part on the score map cells stored in the second data buffer, the plurality of second computations further comprises the steps of:

retrieving the score map cells stored in the second data buffer, generating a second-stage three-dimensional confidence score map based on the retrieved score map cells, concatenating channels of the second-stage three-dimensional confidence score map that each have a similar scale to form a plurality of scale-concatenated channels, wherein each scale-concatenated channel is associated with a scale of a channel of the second-stage three-dimensional confidence score map;

partitioning each of the plurality of scale-concatenated channels into regions, mapping each region in each of the plurality of scale-concatenated channels to its corresponding kernel index in the first data buffer, and for each region, storing, at its corresponding kernel index mapped to the region, a score map cell that has a highest score in the region, and wherein the plurality of third computations further comprises the steps of:

retrieving the score map cells stored in the first data buffer, forming a padded second-stage three-dimensional confidence score map based on the retrieved score map cells, partitioning each channel of the padded post second-stage three-dimensional confidence score map into regions, mapping each region in each of the channels of the padded post second-stage three-dimensional confidence score map to its corresponding kernel index in the second data buffer, and for each region, storing, at its corresponding kernel index mapped to the region, a score map cell that has a highest score in the region.

13. The method according to claim 12, whereby the plurality of second computations further comprises the steps of:

retrieving the score map cells stored in the second data buffer, generating a third-stage three-dimensional confidence score map based on the retrieved score map cells, concatenating channels of the third-stage three-dimensional confidence score map that each have a similar ratio to form a plurality of ratio-concatenated channels, wherein each ratio-concatenated channel is associated with a ratio of a channel of the third-stage three-dimensional confidence score map;

partitioning each of the plurality of ratio-concatenated channels into regions, mapping each region in each of the plurality of ratio-concatenated channels to its corresponding kernel index in the first data buffer, and for each region, storing, at its corresponding kernel index mapped to the region, a score map cell that has a highest score in the region, and wherein the plurality of third computations further comprises the steps of:

retrieving the score map cells stored in the first data buffer, forming a padded post third-stage three-dimensional confidence score map based on the retrieved score map cells, partitioning each channel of the padded post third-stage three-dimensional confidence score map into regions, mapping each region in each of the channels of the padded post third-stage three-dimensional confidence score map to its corresponding kernel index in the second data buffer, and for each region, storing, at its corresponding kernel index mapped to the region, a score map cell that has a highest score in the region.

14. The method according to claim 13, the plurality of second computations further comprises the steps of:

retrieving the score map cells stored in the second data buffer, generating a fourth-stage three-dimensional confidence score map based on the retrieved score map cells, partitioning each of the channels in the fourth-stage three-dimensional confidence score map into regions, mapping each region in each of the channels to its corresponding kernel index in the first data buffer, and for each region, storing, at its corresponding kernel index mapped to the region, a score map cell that has a highest score in the region, and wherein the plurality of third computations further comprises the steps of:

retrieving the score map cells stored in the first data buffer, forming a padded post fourth-stage three-dimensional confidence score map based on the retrieved score map cells, partitioning each channel of the padded post fourth-stage three-dimensional confidence score map into regions, mapping each region in each of the channels of the post fourth-stage three-dimensional confidence score map to its corresponding kernel index in the second data buffer, and for each region, storing, at its corresponding kernel index mapped to the region, a score map cell that has a highest score in the region.

15. The method according to claim 14 whereby each of the channels of the padded post first-stage three-dimensional confidence score map, the padded post second-stage three-dimensional confidence score map, the padded post third-stage three-dimensional confidence score map and the padded post fourth-stage three-dimensional confidence score map comprise border score map cells padded with zeroes.

16. The method according to claim 11, whereby the step of projecting the received bounding box to the score map cell in the first-stage three-dimensional confidence score map by each of the first computations further comprises each first computation:

performing channel recovery on the received bounding box based on the dimensions of the bounding box to determine a channel of the first-stage three-dimensional confidence score map for the received bounding box; and performing spatial recovery on the received bounding box based on the spatial location of the receiving bounding box, and the down sampling ratio of the first-stage three-dimensional confidence score map to determine a spatial location of a score map cell on the channel of the first-stage three-dimensional confidence score map associated with the received bounding box.

17. The method according to claim 16, whereby the step of performing channel recovery on the received bounding box based on the scale and ratio of the bounding box by each of the first computation further comprises each first computation:

identifying a channel of the first-stage three-dimensional confidence score map to be used as the channel for the received bounding box based on Euclidean-distances of the channels of the first-stage three-dimensional confidence score map to the dimensions of the bounding box.

18. The method according to claim 11, whereby kernel indices in the first and second data buffers are grouped into read groups in each data buffer, whereby kernel indices in each read group are read sequentially when it is determined that the read group contains a valid score map cell.

19. The method according to claim 11, whereby kernel indices in the first and second data buffers are grouped into read groups in each data buffer, whereby kernel indices in each read group are skipped when it is determined that the read group does not contain a valid score map cell.

20. The method according to claim 11 further comprising the steps of:

performing a plurality of fourth computations using a fourth set of processing elements communicatively provided between the second and third sets of processing elements, and the first and second data buffers, the plurality of fourth computations comprising the steps of:

arbitrating kernel index conflicts at the first and second data buffers.

* * * * *